(12) United States Patent
Schlanger

(10) Patent No.: US 7,784,878 B2
(45) Date of Patent: Aug. 31, 2010

(54) CONNECTING SYSTEM FOR TENSILE ELEMENTS SUCH AS SPOKES

(76) Inventor: Raphael Schlanger, 128 Hulda Hill Rd., Wilton, CT (US) 06897

( * ) Notice: Subject to any disclaimer, the term of this patent is extended or adjusted under 35 U.S.C. 154(b) by 4 days.

(21) Appl. No.: 11/879,333

(22) Filed: Jul. 17, 2007

(65) Prior Publication Data

US 2007/0257548 A1 Nov. 8, 2007

Related U.S. Application Data

(63) Continuation-in-part of application No. 10/755,653, filed on Jan. 12, 2004, now Pat. No. 7,357,460.

(51) Int. Cl.
*B60B 5/02* (2006.01)
(52) U.S. Cl. .......................... 301/104; 301/55; 403/266; 403/270; 403/282
(58) Field of Classification Search .................... 301/55, 301/56, 57, 58, 59, 61, 104, 110.5; 403/267, 403/268, 270, 278, 282, 375; 29/122.6; 24/461
See application file for complete search history.

(56) References Cited

U.S. PATENT DOCUMENTS

| 3,591,215 | A | * | 7/1971 | Frost et al. ................... 403/396 |
| 4,727,237 | A | * | 2/1988 | Schantz ................. 219/121.63 |
| 5,110,190 | A | * | 5/1992 | Johnson ....................... 301/55 |
| 5,957,030 | A | * | 9/1999 | Keller et al. ................ 92/13.41 |
| 2003/0081990 | A1 | * | 5/2003 | Ozawa et al. ................ 403/270 |

FOREIGN PATENT DOCUMENTS

GB 2037923 A * 7/1980

* cited by examiner

*Primary Examiner*—Russell D Stormer

(57) ABSTRACT

A tensile connector assembly comprising a longitudinal tensile element having a longitudinal axis, an end portion and a cross-section, a connecting element connected to the longitudinal tensile element, and a bracing element connected to the longitudinal tensile element. With a tensile axis of applied tensile load along said longitudinal tensile element. Where the longitudinal tensile element is anchored to the bracing element and the connecting element is connected to the longitudinal tensile element via a welded connection at a welded interface. Where the connections permit the longitudinal tensile element to support said tensile load along the tensile axis.

74 Claims, 20 Drawing Sheets

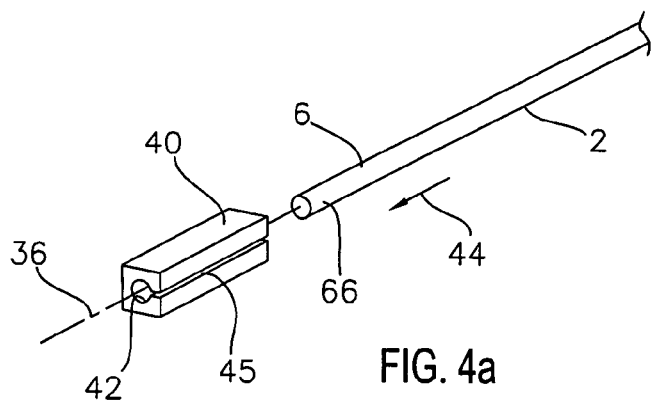
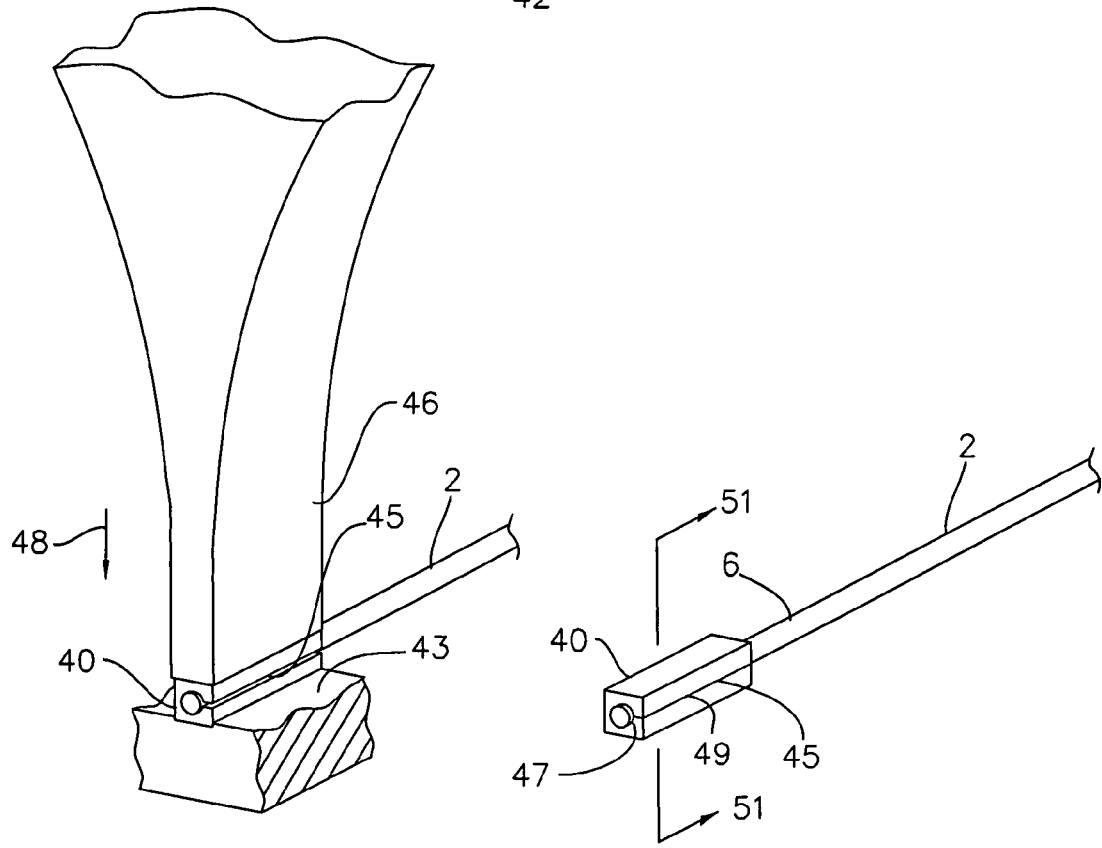
FIG. 4a
FIG. 4b
FIG. 4c

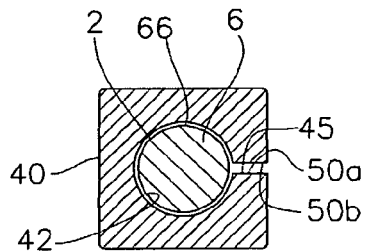
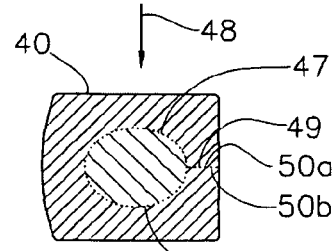
FIG. 5a   FIG. 5b
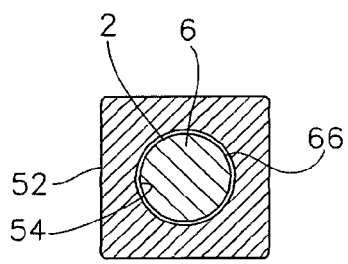
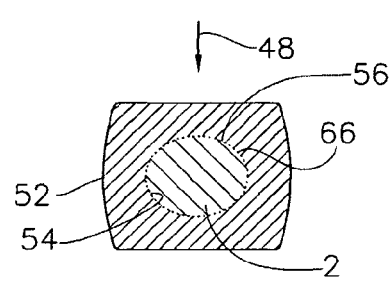
FIG. 6a   FIG. 6b
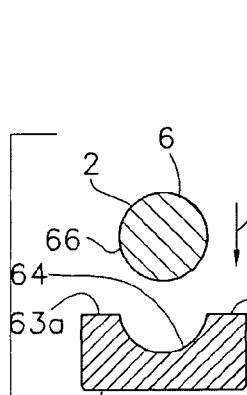
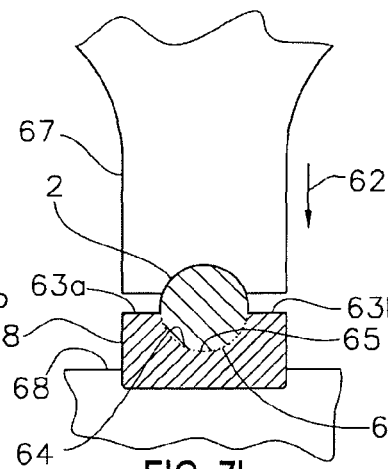
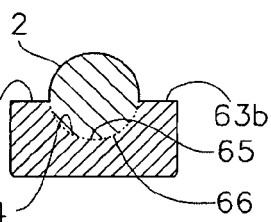
FIG. 7a   FIG. 7b   FIG. 7c
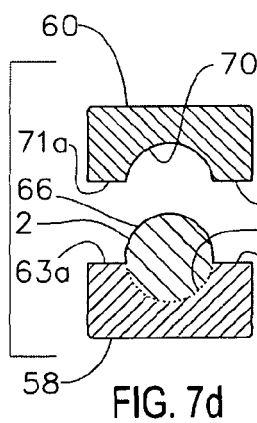
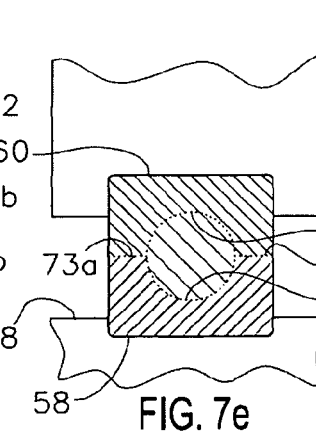
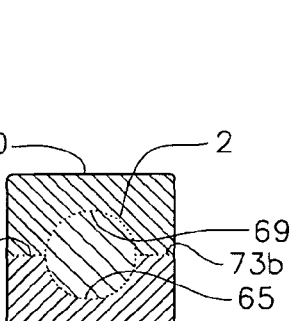
FIG. 7d   FIG. 7e   FIG. 7f

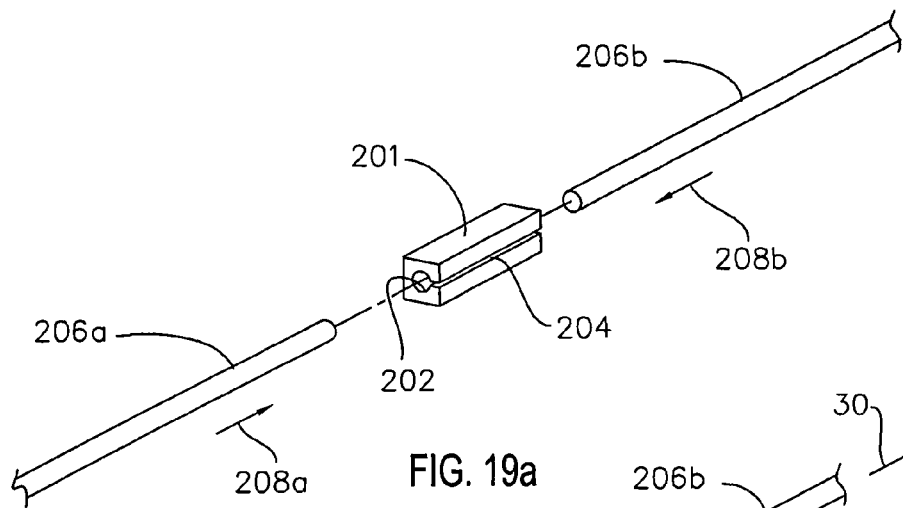
FIG. 19a
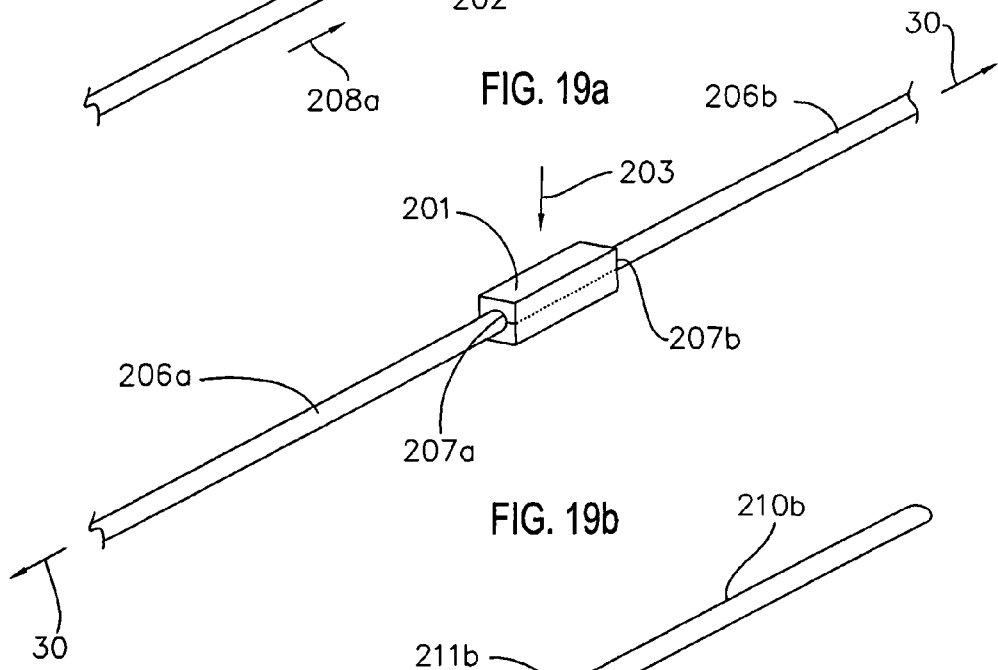
FIG. 19b
FIG. 19c
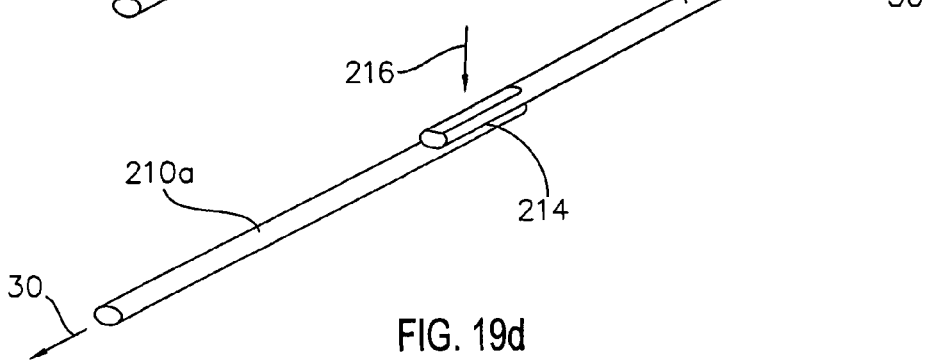
FIG. 19d

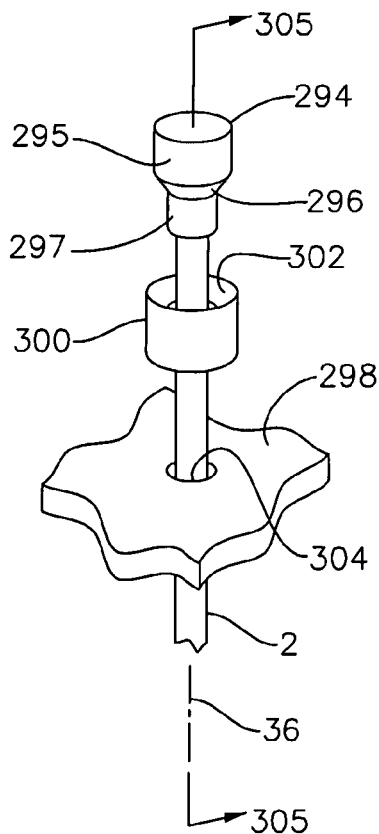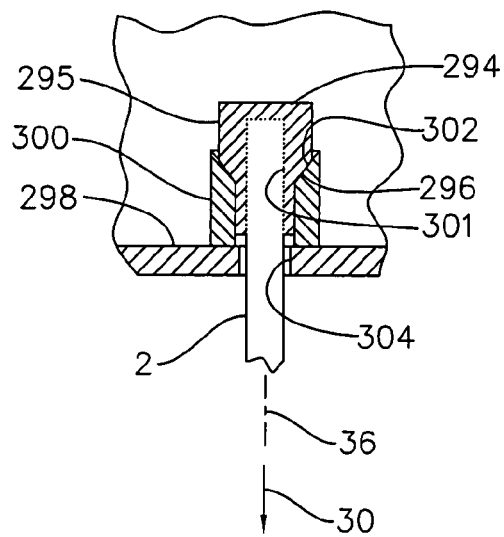
FIG. 25a  FIG. 25b
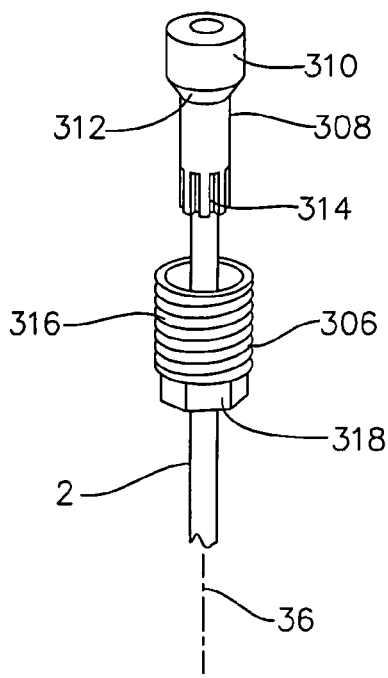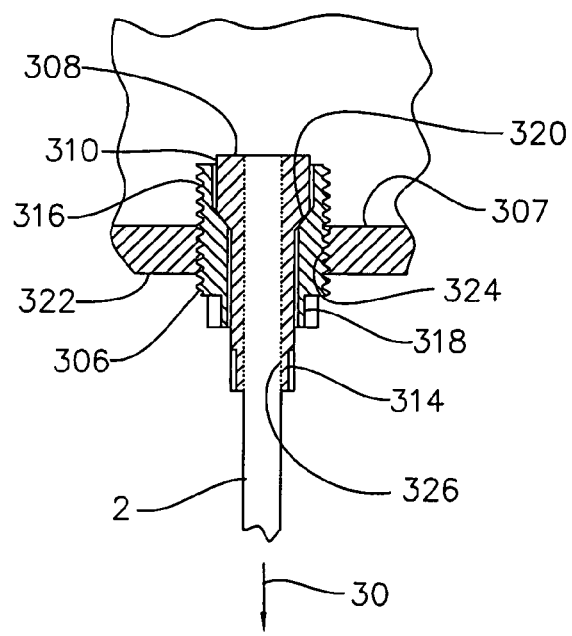
FIG. 26a  FIG. 26b

CONNECTING SYSTEM FOR TENSILE ELEMENTS SUCH AS SPOKES

CROSS-REFERENCE TO RELATED APPLICATION

This application is a Continuation-In-Part of U.S. patent application Ser. No. 10/755,653, filed Jan. 12, 2004 now U.S. Pat. No. 7,357,460.

BACKGROUND OF THE INVENTION (1) Field of the Invention

The present invention relates to an improved connection system for a tensile element, particularly applicable to the spoke of a vehicle wheel, such as a bicycle wheel.

(2) Description of the Related Art

Heretofore, the vast majority of bicycle wheels have been constructed using steel wire spokes that are connected, at their inner end, to a central hub component and, at their outer end, to a metallic rim hoop. The spokes are generally of steel construction while the hub and rim may be of aluminum or steel construction. The spokes, hub and rim are each formed as separate components that are then joined together with mechanical connections. These steel wire spokes commonly have one headed end for connection with the bicycle hub, with an opposing end that is directly threaded to accept a spoke nipple that engages the outer rim hoop. By adjusting the threaded connection between the spoke and the nipple, the overall length of the spoke may be selectively shortened or lengthened to create a balanced pretension in the spokes of the wheel.

Bicycle spokes serve as structural tensile elements where the tension of the spoke is resisted by the compression of the outer rim hoop to create a remarkably efficient wheel structure for handling the loads associated with the operation of the bicycle. The basic technology of conventional bicycle spokes has remained unchanged for more than a century.

Cyclists are continually striving to reduce the weight and increase the efficiency of their bicycle, especially the rotating components such as the bicycle wheel. However, the steel spokes of conventional bicycle wheels are quite heavy and add significant weight to the wheel assembly.

In addition to their excessive weight, steel bicycle spokes have poor vibration-damping characteristics and tend to be very efficient at transmitting road vibration to the rider. By transmitting vibration, rather than absorbing it, the conventional steel-spoke bicycle wheel lacks in rider comfort and control.

In an attempt to reduce weight, many makers of high-end wheels are forming their spokes from thinner gage steel wire. This causes the stress in the spoke to increase and makes the wheel more prone to spoke failure due to fatigue. Further, the thinner steel wire has lower tensile stiffness, which can contribute to a reduced lateral stiffness of the wheel.

The spokes of most conventional bicycle wheels are constructed of steel wire with a sharp "J" bend close to the headed end and adjacent to the point where they pass through the hole in the flange. The "J" bend region of the spoke is considerably weaker and less ductile due to the overstress of the material during the forming required to achieve this bend. As would be expected, the "J" bend region is a common breakage point for spokes of conventional design. Spoke manufacturers have attempted to compensate for this shortcoming by thickening the wire in this region, but this solution results in considerable extra expense and weight.

The tensile forces within the spoke create relatively high stresses at their connection points and these connection points and connection hardware must therefore be capable of withstanding these stresses. In the conventional spoke connection arrangement, stresses due to the spoke tension are concentrated over a relatively small region of the hub flange, namely the small portion of the hub flange that is radially outward from the spoke hole. This requires that the hub flange construction be based on expensive, higher strength materials and the use of more expensive forming processes, such as forging, rather than less costly processes, such as die casting or injection molding. Further, these stresses require that the flange be designed with robust thickness, thus adding weight to the wheel assembly.

It is often an objective to construct wheels with spokes that are flattened along their length to create a more aerodynamic cross-section profile. With a conventional hub flange, this creates a problem where the extra wide spoke cross section must pass through the round hole in the hub flange. The common assembly method, when flattened spokes are utilized, requires the slotting or notching of each individual spoke hole in the two hub flanges to allow the spoke to pass through. This additional operation adds considerable expense and weakens the hub flange as well.

With conventional wheels, the spoke is simply passed through the flange hole until the head of the spoke contacts the edge of this hole. The result is a loose clearance fit between the hub flange and the spoke, which permits the spoke to squirm and shift inside this hole. This undesirable movement results in wear at the flange and additional flex at the rim and also causes the wheel to come out of alignment (true) rather easily.

In the last 20 years, great strides have been made in the development of very lightweight materials that also have excellent tensile characteristics. Some of the most attractive of these materials include high-performance fibers, such as carbon fiber, aramid fiber, liquid crystal fiber, PBO fiber and the like. However, when attempting to utilize them as spokes in bicycle wheel construction, these fibrous materials are far more difficult to efficiently couple or terminate than their steel-wire counterparts. This is the primary reason that the vast majority of bicycle wheels are still constructed using steel spokes.

In recent years, some attempt has been made to improve on this conventional wheel design, but the changes have been minor and still retain the same materials and basic configuration. Interestingly, many of these more modern designs are simply a rehash of inventions that are more than 90 years old. This is likely due to the fact that, aside from some more esoteric examples, these modern wheels rely on similar materials and construction techniques as those employed 90 years ago.

SUMMARY OF THE INVENTION

The present invention comprises a longitudinal tensile element having an end portion and a cross-section thereof, a bracing element, and a tensile axis of applied tensile load along the longitudinal tensile element. The longitudinal tensile element is connected to at least one bracing element via a welded connection between the longitudinal tensile element and either the bracing element or an intermediate element.

The embodiments described herein represent a range of configurations wherein a welded connection is utilized to create an effective coupling or termination of a tensile element such as a bicycle spoke. The result is an improved assembly, including a means to connect the spoke with a bracing component, such as a hub or rim, to create a vehicle wheel that is exceptionally durable and light in weight.

In accordance with the present invention, it has now been found that the forgoing objects and advantages may be readily obtained:

It is an object of the present invention to provide a strong and robust connection to anchor a tensile element. The present invention is based on a welded connection, where the spoke, otherwise considered to constitute a tensile element, is welded to a connecting element to provide anchoring for the tensile element, thus permitting the tensile element to efficiently support tensile loads. This welded connection is preferably a welded connection between thermoplastic polymer elements at a welded interface. This welded interface is preferably over a relatively large surface area so that stress at the welded connection is reduced. Thus, the present invention provides a strong and robust connection to anchor a tensile element.

It is a further object of the present invention to provide a connection for a tensile element that has reduced stresses and also minimizes flex or squirm at its connection point. Since the welded connection of the present invention generally results in an integral connection between two elements, and clearance between the two elements is eliminated, as well as any associated flex or squirm.

As illustrated in many of the embodiments of the present invention, the sharp J-bend of traditional spokes may eliminated with the present invention, thereby eliminating a region where the spoke material is highly stressed and prone to failure. Further, the welded spoke connection of the present invention may result in a hub flange or rim that is conformed or matched to the geometry of the spoke to support the connection therebetween. Therefore the spoke tensile loads produce little or no relative movement or squirm between the spoke and the hub flange or rim. The exposed portion of the spoke extends to its connection at the rim in a straight and aligned direction. Thus spoke tensile forces may now be evenly shared among the spokes of the wheel, resulting in a stronger, more reliable wheel that is less prone to broken or worn components and is far more effective at maintaining trueness and rim alignment.

It is a further object of the invention to provide a connection for a tensile element that is lightweight and lends itself to the utilization of lightweight, high-performance materials. In an effort to enhance the performance of the bicycle, designers have continually aimed toward reducing the weight of its components while maintaining the strength and reliability that the marketplace requires. This is particularly true of the rotating components, such as the wheel, since any weight reduction reduces the rotational inertia as well as the static mass of the bicycle.

The present invention may be readily adapted to tensile element(s) that include lightweight fibrous materials, including high-performance fibers such as carbon fiber, glass fiber, boron fiber, aramid fiber (such as Kevlar®), liquid crystal fiber (such as Vectran.®), PBO (polyphenylenebenzobisoxasole) fiber (such as Zylon.®), polyethylene fiber (such as Spectra®) and the like. These materials often represent a significant performance improvement over the steel spokes they replace. In comparison with the steel wire commonly used in spoke construction, these fibrous materials often have equivalent or greater tensile strength than the steel spoke at a much lower density. This allows for the construction of a much lighter spoke and a lighter wheel. Further, these materials have significantly better vibration-damping characteristics for greater rider comfort and control. Still further, these materials also have excellent tensile fatigue properties to reduce or even eliminate spoke failures due to fatigue.

Further, due to its relaxed strength requirements at its connection point, the present invention permits the use of lightweight materials, such as polymers or reinforced polymers, to produce the hub flange and/or rim component. Utilization of these lightweight materials is very effective at reducing the weight of the wheel. In comparison to their steel or aluminum counterparts, polymeric materials provide a significant weight savings.

Additionally, since the present invention permits the use of net-shape molding operations, the hub flange may now be produced to include far more intricate geometry than would be realistic for a hub that is machined from billet. This allows the designer to eliminate material from the hub flange in the locations where it is not required, further saving precious weight.

While the present invention may be readily adapted to tensile elements of fibrous or fiber-reinforced construction, the embodiments described herein may be readily adapted to other materials, including isotropic materials as well. The present invention also may provide localized reinforcement of the tensile element in the region of the coupling or termination. This reinforcement may be advantageous to provide support to the tensile element(s) in applications where the tensile element may, for example, be more brittle, more flexible, weaker or more notch-sensitive. Further, the present invention provides effective coupling or termination of a tensile element that would otherwise be difficult or impossible to achieve.

It is often quite common for high-performance fibers to be incorporated within a matrix, often a polymer resin matrix. The matrix serves to bind the individual fibers together so that the fibers may work together to provide structural advantages that are well known in industry. Further, this matrix may be a thermoplastic resin matrix, which may be readily welded. Thus, present invention may be utilized in conjunction with tensile elements that incorporate these high-performance fibers, which are often significantly lighter in weight than their metallic counterparts.

It is a further object of the invention to provide a connection for a tensile element that has good vibration-damping characteristics to reduce the vibration that is transmitted from the road to the vehicle. Polymer resins and high-performance fibers are generally recognized to have significantly greater vibration damping characteristics than their metallic counterparts. Since the present invention facilitates the utilization of these materials, enhanced vibration damping characteristics may thereby be achieved.

It is a further object of the invention to provide a connection for a tensile element that requires a minimum of parts and is not overly complex. Since the welded connection of the present invention is achieved through the joinder of two components, the multiplicity of components associated with a mechanical connection may be reduced. Further, the welded connection may also preclude the use of any adhesive, which would otherwise add to complexity of the connection. Further, the present invention may be utilized to join the tensile element directly to a bracing element, thereby simplifying the connection even further. For example the vehicle wheel spoke may be directly welded to the hub flange and/or rim.

It is a further object of the invention to provide a connection for a tensile element that is readily manufacturable and is relatively inexpensive to produce. There presently exists a wide range of welding processes that are available in industry, which may be easily employed in the manufacture of tensile element connections of the present invention. Often these processes require merely seconds to achieve a robust weld and thus lend themselves to high productivity. Further, since the connection elements may be molded or cast, more complex geometry may be achieved, which can increase the functionality of the element and reduce the number of auxiliary components and/or the complexity of the manufacturing operations.

It is a further advantage of the present invention to provide a reduction in cost through the ability to utilize inexpensive and efficient manufacturing techniques and through the use of lower cost component parts. Since the spoke tension stresses of the present invention are distributed over a wider region of the hub flange interface, stresses are reduced within the hub flange material. Thus the strength requirements for the hub flange material are reduced and lower performance materials may be utilized, further reducing the cost as compared with conventional hubs. For example, the hub flange of some embodiments of the present invention may now be formed from relatively inexpensive polymer resins. These materials also lend themselves to lower-cost forming operations such as plastic injection molding.

The present invention is uniquely applicable to arrangements wherein the hub flange and/or rim are formed from polymeric materials. Many of these materials, especially engineering polymers, exhibit good strength characteristics and are relatively inexpensive and easy to mold. Heretofore, these materials have not been used successfully applied in hub flange and rim applications because they do not exhibit sufficient hardness to withstand the high contact stresses associated with conventional spoke attachment technology.

Further, fiber reinforced injection molding compounds may now be utilized in the present invention. With these high strength composite polymers, the injection molding process permits the fibers to attain a generally random orientation within the matrix. This is a significant benefit that would not apply if the hub were machined from a fiber reinforced plastic billet. Fiber reinforced billet is normally produced by an extrusion process where the fibers become highly aligned in the direction of extrusion. Thus, a hub shell machined from such a billet would have relatively low strength perpendicular to the direction of extrusion.

Some of the embodiments of the present invention also illustrate the ease with which duplex spokes may be incorporated into the present invention. These duplex spokes create the equivalent of two individual spokes using only a single series of manufacturing operations and are thus less expensive to produce.

The hub and hub flange of the present invention may be produced using 'net shape' molding techniques that reduce or eliminate the need for expensive machining operations. Since this design may be well suited to such molding or casting operations, the desired hub geometry may be produced with few, if any, secondary machining operations. In the case where subsequent machining is required, far fewer of these costly operations are anticipated than if the hub were produced from a billet or a forging. Further, in such a "net shape" forming operation, the amount of material waste is greatly reduced, particularly when compared to a part that is fully machined from billet.

Further objects and advantages will become apparent from a consideration of the ensuing description and drawings.

BRIEF DESCRIPTION OF THE DRAWINGS

The present invention will be more readily understandable from a consideration of the accompanying exemplificative drawings, wherein:

FIG. 2b is a cross-section view of the prior art bicycle wheel as seen generally in the direction 15-15 of FIG. 2a;

FIG. 3b is a cross-section view of the bicycle wheel of FIG. 3a as seen generally in the direction 11-11 of FIG. 3a;

FIG. 4a is a partial perspective view of an embodiment of the present invention in exploded view, including a spoke and a slotted collar;

FIG. 4b is a partial perspective view of the embodiment of FIG. 4a, showing the collar welded to the spoke including an ultrasonic horn and nest;

FIG. 4c is a partial perspective view of the embodiment of FIG. 4b, showing the collar as welded and thereby joined to the spoke;

FIG. 5a is a cross-sectional view, taken perpendicular to the tensile axis, as seen in the direction 51-51, of the embodiment of FIG. 4a, and showing the spoke and collar assembled prior to welding;

FIG. 5b is a cross-sectional view, taken perpendicular to the tensile axis, of the embodiment of FIG. 5a, and showing the spoke and collar as welded and thereby joined to the spoke;

FIG. 6a is a cross-sectional view, taken perpendicular to the tensile axis, of an embodiment of the present invention, and showing the spoke and collar assembled prior to welding;

FIG. 6b is a cross-sectional view, taken perpendicular to the tensile axis, of the embodiment of FIG. 6a, and showing the spoke and collar as welded and thereby joined to the spoke;

FIG. 7a is a cross-sectional view, taken perpendicular to the tensile axis, of an embodiment of the present invention, and showing the spoke and collar base prior to their assembly;

FIG. 7b is a cross-sectional view, taken perpendicular to the tensile axis, of the embodiment of FIG. 7a, and showing the spoke being welded to the collar base with an ultrasonic welding horn;

FIG. 7c is a cross-sectional view, taken perpendicular to the tensile axis, of the embodiment of FIG. 7b, and showing the spoke and collar base as welded and thereby joined together;

FIG. 7d is a cross-sectional view, taken perpendicular to the tensile axis, of the embodiment of FIG. 7c, and showing the collar cap prior to its assembly with the assembly of FIG. 7c;

FIG. 7e is a cross-sectional view, taken perpendicular to the tensile axis, of the embodiment of FIG. 7d, and showing the collar cap being welded to the assembly of FIG. 7c with an ultrasonic welding horn;

FIG. 7f is a cross-sectional view, taken perpendicular to the tensile axis, of the embodiment of FIG. 7e, and showing the spoke as welded to the collar base and collar cap;

FIG. 9b is a cross-sectional view, taken perpendicular to the tensile axis, of the embodiment of FIG. 9a, and showing a cover prior to assembly with the welded assembly of FIG. 9a;

FIG. 9d is a cross-sectional view, taken perpendicular to the tensile axis, of the embodiment of FIG. 9c, and showing the cover as welded to the previously welded assembly of FIG. 9a;

FIG. 19a is a partial perspective exploded view, of an embodiment of the present invention, and showing two spokes prior to their assembly with a common collar;

FIG. 19b is a partial perspective view, of the embodiment of FIG. 19a, and showing the two spokes as welded to the common collar;

FIG. 19c is a partial perspective exploded view, of an embodiment of the present invention, and showing two spokes as overlapping each other prior to welding;

FIG. 19d is a partial perspective view, of the embodiment of FIG. 19c, and showing the two spokes welded to each other in an overlapping weld;

FIG. 25a is a partial perspective exploded view of an embodiment of the present invention, and showing the spoke passing through a hole in a bracing element, including a collar welded to the spoke and an intermediate ferrule;

FIG. 25b is a is a cross sectional view, taken perpendicular to the tensile axis, as seen in the direction 305-305, of the embodiment of FIG. 25a, showing the spoke with an overlie engagement with the bracing element via the collar and intermediate ferrule;

FIG. 26a is a partial perspective exploded view of an embodiment of the present invention, and showing the spoke passing through an intermediate threaded ferrule, including a collar joined to the spoke;

FIG. 26b is a is a cross sectional view, taken perpendicular to the tensile axis, of the embodiment of FIG. 26a, showing the collar as engaged to the ferrule and the ferrule as threadably engaged to a bracing element;

DETAILED DESCRIPTION OF THE INVENTION

Figure 1:
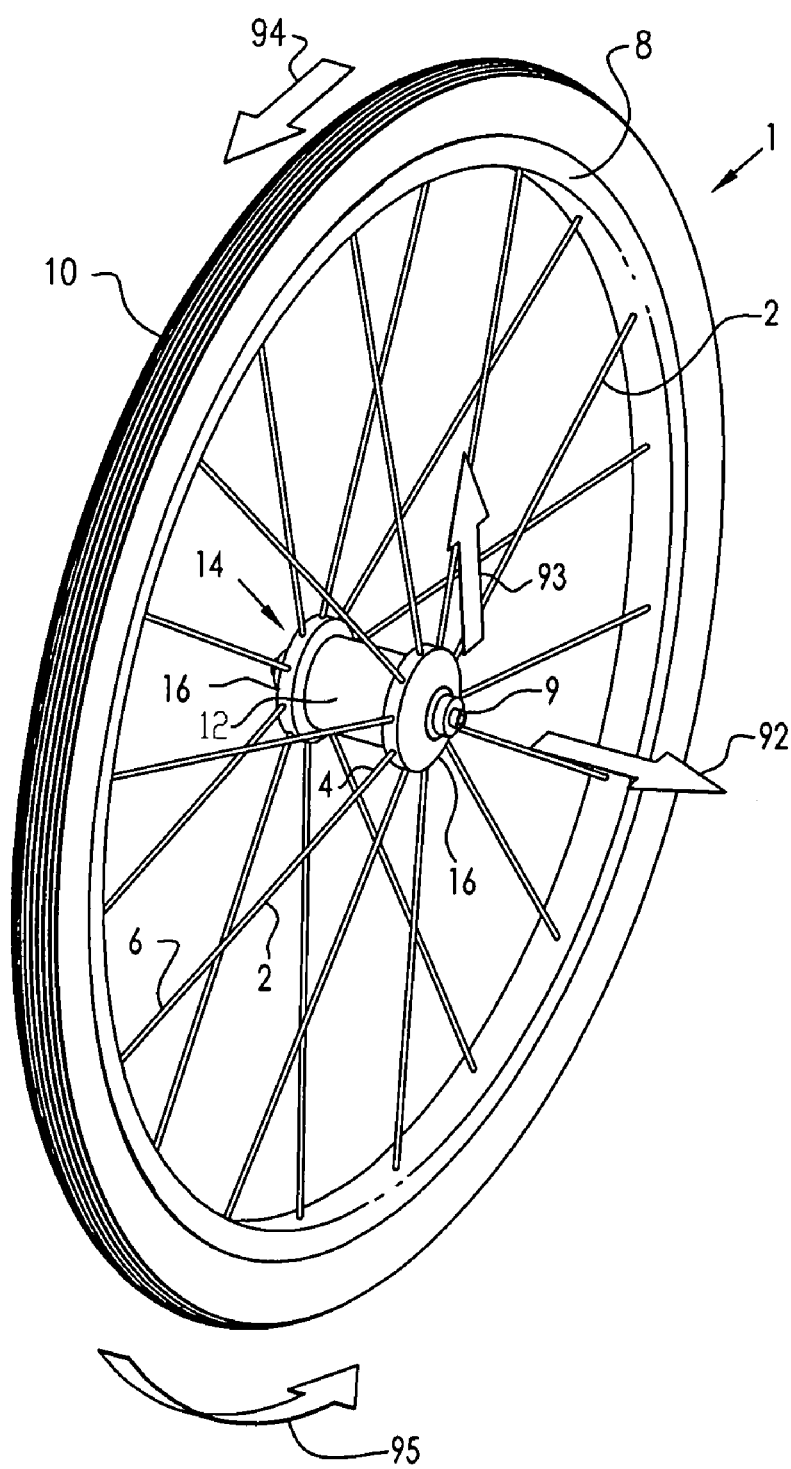
FIG. 1 is a perspective view schematically illustrating the general configuration of a prior art vehicle wheel as applied to a bicycle wheel.

The present invention comprises a longitudinal tensile element having an end portion and a cross-section thereof, a bracing element, and a tensile axis of applied tensile load along the longitudinal tensile element. The longitudinal tensile element is connected to at least one bracing element via a welded connection between the longitudinal tensile element and either the bracing element or an intermediate element.

A longitudinal tensile element is a generally long slender element, with a length greater than its cross sectional width, and with a longitudinal axis extending generally along its length. The longitudinal tensile element includes sidewall surface(s) that extend generally along its length. As such, the longitudinal axis is generally parallel to the sidewall surface. Some examples of a longitudinal tensile element include the spoke of a vehicle wheel, a guy wire, a control cable, or a tendon. In most of the embodiments of the present invention, the longitudinal tensile element is capable of supporting tension, otherwise known as positive tensile loading, along its length. However, the tensile element may alternatively support compression, otherwise known as negative tensile loading, along its length, where the longitudinal tensile element provides columnar support between two bracing elements. The tensile axis is the axis along which tensile loads are applied to the tensile element, and is commonly collinear with the longitudinal axis, especially in the region of the structural span of the longitudinal tensile element. For the purposes of explanation herein, the term "longitudinal axis" is generally interchangeable with the term "tensile axis", unless otherwise noted.

A bracing element is one that resists or braces against all or part of the load of a tensile element. In other words, in order for a tensile element to maintain its tension (or compression) and remain a generally static structure, it must have a resisting or bracing element to bear against. Thus, the tensile element is generally anchored to two bracing elements and the tensile element thereby serves to connect the two bracing elements to each other. In an example where the tensile element is generally held in tension, such as the spoke of a tension-spoke vehicle wheel, a first bracing element could be the hub flange and a second bracing element could be the outer rim hoop. Similarly, in the case where the tensile element is generally held in compression, such as the spoke of a compression-spoke vehicle wheel, the bracing element is that element which the tensile element is pushed against.

In the discussions herein, the term "coupling" identifies a connecting element that serves to provide a structural connection between the two tensile elements, thus permitting tensile loads to be transmitted from one tensile element to another. The term "termination" or "anchor" identifies a connecting element that serves to provide a means to connect the tensile element (i.e. spoke), either directly or indirectly, to a bracing element (i.e. the hub or rim), to which the tensile element is intended to be anchored.

In a welded connection, the adjoining materials of the two welded components are softened or liquefied to flow and become fused together to form an integrally joined unit. In a welded connection, the two components to be welded are usually separately formed prior to welding. It is often preferable that the softening and fusing occurs in a generally localized region of the two welded components, as this permits these components to retain their original form in regions outside this localized region. As a general rule, a welded connection may not be disassembled without damaging one or both of the components.

In a preferred embodiment, each of the two components to be welded includes a thermoplastic polymeric material on at least a portion of its surface. The welded connection comprises the welding of the thermoplastic polymeric surface of a first component with the thermoplastic polymeric surface of the second component. One well-known process for achieving such thermoplastic welding is referred to as ultrasonic welding whereby ultrasonic energy creates high-frequency mechanical vibration that, in turn, imparts heat to the joint to be welded. Ultrasonic welding is especially suited to melt thermoplastic polymers, although the process has also been applied to metals as well. Other welding techniques such as spin welding and vibration welding, among others, are also candidate processes that also rely on mechanical energy to produce localized melting and joining. While the application of mechanical energy is particularly suited to provide the localized melting and welding required for assembly as described, it is also anticipated that the thermoplastic polymer material may be melted through the direct application of heat or energy from a focused source such as a laser or electron beam. Other thermal energy welding methods may include thermal conduction, such as hot-plate welding or infra-red energy transfer.

Alternatively, some polymeric materials (plastics) may be chemically welded together. In such a case, a chemical, such as a solvent is used to chemically soften the materials to be welded. When the chemical is fully reacted or otherwise evaporated, a firmly welded connection is achieved.

While it is most often preferable to weld two components directly to each other, it is also envisioned that a filler material may be utilized to facilitate welding. In such a case, a filler material is located within the welded joint such that each component is welded to the filler material and thus the two components are thereby welded to each other. One such example is to utilize a filler material that includes metallic particles. When this material is placed within a strong magnetic field, the metallic particles temporarily become heated to soften or liquefy the filler material and/or the mating components, thereby welding to two components to each other, either directly or through the intermediate filler material. Such a process is commonly referred to as induction welding.

With several of these welding processes, welding is achieved through the combination of heating and pressure. The heating serves to temporarily soften and/or liquefy the two components at the interface where they meet, thereby permitting the material of the two components to flow and become fused together. The pressure is applied to the components in order to force the two into intimate contact during the welding process. With the longitudinal tensile element described herein, this pressure may be applied in a direction generally perpendicular to the longitudinal axis or a direction generally parallel to the longitudinal axis or some combination of these two directions. As an alternate explanation, since the sidewall surface of the longitudinal tensile element is generally parallel to the longitudinal axis, this pressure may be applied in a direction perpendicular or parallel to the sidewall surface. While this pressure is involved with most of the preferred welding processes described herein, welding may alternatively be achieved without pressure. In such a case, the heated materials of the two components are simply allowed to slump together through gravity and/or surface tension, such that the components are thereby fused.

The longitudinal tensile element has a sidewall surface(s) that are generally parallel to the longitudinal axis and an end face that is generally perpendicular to the sidewall surface. With a slender longitudinal tensile element, the sidewall tends to have far greater available surface area than its end face. It is envisioned that the welded joinder described herein may include a welded interface with the end face. However, it is often more advantageous to provide a welded interface with a portion of the sidewall surface, since the larger available surface area for welding may afford reduced stress at the weld due to loading. Conversely, the larger surface area of the sidewall weld may provide greater load capacity across the welded interface. Since greater surface area tends to provide a more robust connection, it is often preferable to provide a welded interface that extends longitudinally along the sidewall surface by at least twice the cross sectional thickness of the longitudinal tensile element. For this reason, the embodiments of the present invention described herein are primarily focused on welded interface(s) with the sidewall of the longitudinal tensile element. Often it is easiest to create an effective sidewall weld by applying welding pressure in a direction generally perpendicular to the sidewall surface, since this direction serves clamp the parts together along the sidewall surface. Thus, it may be seen that it is often preferable to apply welding pressure in a direction perpendicular to the sidewall surface. This preference is reflected in a majority of the embodiments of the present invention.

In order to take advantage of the lightweight and high strength of the high-performance fibers mentioned hereinabove, it may be preferable to incorporate these material(s) in the longitudinal tensile element. These materials tend to be anisotropic and have greater strength along the direction of the fiber. Thus it is preferable that these fibers are aligned to be parallel to the tensile axis. It is also preferable that these reinforcement fibers be encapsulated in a matrix. It is further preferable that the matrix is a thermoplastic polymeric resin matrix, since many thermoplastic polymer resins are generally weldable. While short or discontinuous fibers often provide significant reinforcement to the matrix material, it is preferable that the fibers be as long as possible to provide the greatest overlap with adjacent fibers. The utilization of continuous fibers that extend generally along the length of the longitudinal tensile element provides the highest mechanical properties. It is further preferable that the fibers extend along the tensile axis to overlap within the region of the welded interface.

The welded interface may be utilized to provide a direct connection between the tensile element and a bracing element. Alternatively, the welded interface may be utilized to provide a connection with a connecting element that is, in turn, connected to a bracing element. Further, an auxiliary or intermediate element may be incorporated into the design to facilitate the connection between the tensile element and the bracing element.

FIG. 1 describes the basic configuration of an exemplary vehicle wheel, in particular, a bicycle wheel 1, as well as a description of the direction conventions used throughout this disclosure. The hub shell 14 is rotatable about the axle 9 and includes at least two axially spaced hub flanges 16, each of which include a means for connecting with the spokes 2. The hub flange 16 may be contiguous with the hub shell 14 or it may be separately formed and assembled to the hub body 12 portion of the hub shell 14. The spokes 2 are affixed to the hub flange 16 at their first end 4 and extend to attach the rim 8 at their second end 6. The tire 10 is fitted to the outer periphery of the rim 8. The axial direction 92 is any direction parallel with the axis of the axle 9. The radial direction 93 is a direction generally perpendicular to the axial direction 92 and extending generally from the centerline of the axle 9 radially outwardly toward the rim 8. The tangential direction 94 is a direction generally tangent to the rim at a given radius. The circumferential direction 95 is a cylindrical vector that wraps around the axial direction 92 axis at a given radius. The wheel of FIG. 1 is generic and may be of tension-spoke or compression-spoke design.

While it is most common for the hub shell 14 to rotate about a fixed axle 9, there are some cases where it is desirable to permit the axle 9 to be fixed with the wheel 1 such as the case where the wheel 1 is driven by the axle 9.

For the purposes of using conventional terminology, the term "hub flange" is used herein to describe a region of the hub shell 14 to which the spokes 2 are joined. While the surface of the hub flange may be raised and flange-like in comparison to other surfaces of the hub shell 14, this is not a requirement for the present invention and the hub flange 16 may alternatively be flush or recessed relative to other hub shell surfaces.

It may be easiest to mold or otherwise form or fabricate the individual hub flanges 16 separately and then assemble these hub flanges 16, along with other components as required, such as the body portion 12, to create a complete hub shell 14. This hub shell 14 assembly may be permanent or else it may be removably assembled, allowing the hub flange 16 to be disassembled from the other portions of the hub shell 14 for servicing in the field. However, it is also anticipated that the hub shell 14, including the body portion 12 and a multiple of hub flanges 16, may be molded or formed together as a unit.

As is well known in the art, a wheel 1 may be of tension-spoke construction, where the central hub hangs in tension by the spokes from the rim portion directly above, or it may be of compression-spoke construction, where the hub is supported by compressing the spoke directly beneath it. Since the present invention may be directed toward bicycle wheels and since the tension-spoke wheel is generally a more efficient structure than compression-spoke wheel, most of the discussion herein is focused with an eye toward tension-spoke wheel construction. However, it is anticipated that most, if not all, of the embodiments of the present invention may be applied to compression-spoke wheel construction as well. For a tension-spoke wheel, it is preferable that the wheel includes at least two hub flanges that are axially spaced on either side of the rim or, more specifically, the spoke attachment points at the rim. Thus the spokes fixed to opposite hub flanges will converge as they extend to the rim as illustrated in FIG. 2b. Additionally, a tension-spoke wheel will usually be pretensioned during assembly to create a pretensioned structure of balanced spoke tension that allows the axle loads to be distributed among several, if not all, of the spokes of the wheel. It is this ability to share the stresses among its spokes that helps to make the tension-spoke wheel the highly efficient structure that it is. For a compression-spoke wheel, it is often preferable to employ at least two axially spaced hub flanges, however, in the case where the spokes have sufficient bending stiffness to support the requisite lateral loads, only a single hub flange may be employed.

Figure 2A:
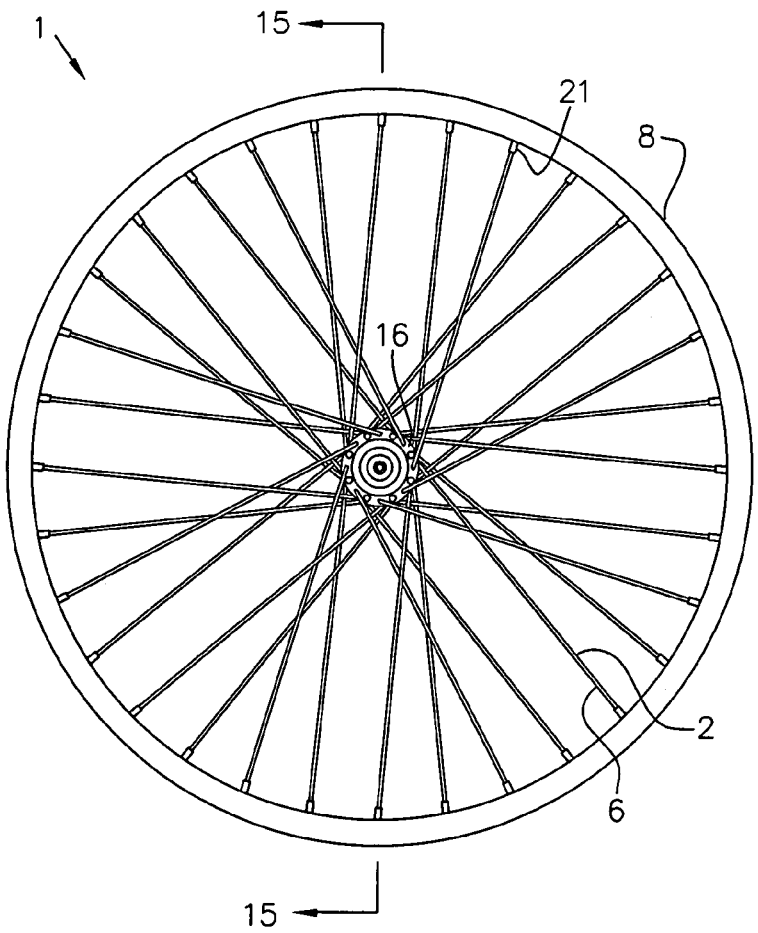
FIG. 2a is an axial plan view illustrating a prior art bicycle wheel.
Figure 2B:
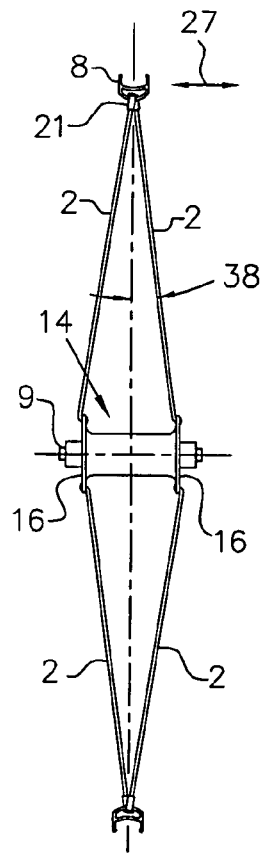
Figure 2C:
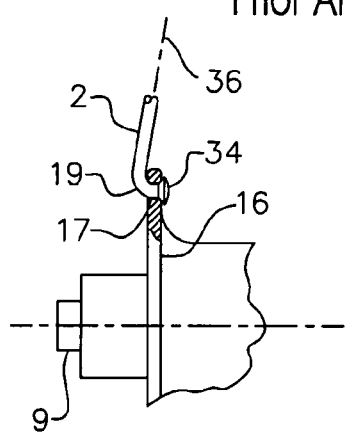
FIG. 2c is a fragmentary view detailing the view illustrated in FIG. 2b where the hub flange is shown in a partial cross-section to illustrate the connection with the spoke.

FIGS. 2a, 2b and 2c describe the current technology in conventional bicycle wheels that most cyclists are familiar with. This prior art design includes a rim 8, a hub shell 14 and a plurality of spokes 2. The hub shell 14 is rotatable about the axle 9 and includes a pair of axially spaced hub flanges 16. The wheel is assembled by first threading each individual spoke 2 through an axial hole 17 in the hub flange 16 until the j-bend 19 is hooked within the hole 17. The spoke 2 is then pivoted to extend in a generally radial direction toward the rim 8. The enlarged portion 34 or "head" of the spoke 2 prevents the spoke 2 from pulling through the hole 17 in the hub flange 16. The second end 6 of each spoke 2 is then fixed to the rim 8 via spoke nipples 21. Tightening the threaded engagement between the spoke nipple 21 and the spoke 2 serves to effectively shorten the length of the spoke 2. Thus, as the nipples 21 are threadably tightened, the spokes are drawn up tight and a degree of pre-tension is induced in the spoke 2. By selectively adjusting this threaded engagement, the spoke pre-tension may be adjusted to align the trueness of the rim 8. The spoke pre-tension is resisted by circumferential compression of the rim 8 and it is this balance of forces that imparts efficient structural integrity to the bicycle wheel 1. Also shown in FIG. 2b is bracing angle 38 between the radial centerline plane of the rim 8 and the tensile axis 36 of the spokes 2. As this bracing angle 38 is increased, the lateral stiffness (i.e. stiffness in the axial direction 92) of the wheel 1 is also increased.

Figure 3A:
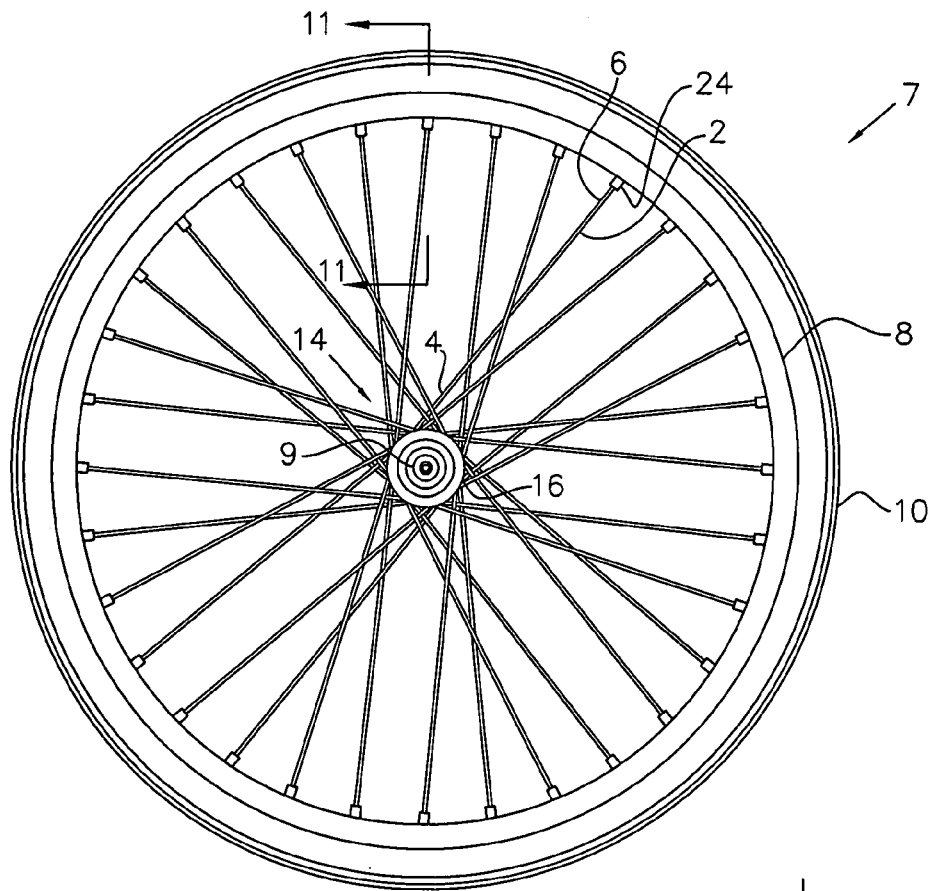
FIG. 3a is a plan view of a bicycle wheel, including collars or connecting elements as described in the present invention.
Figure 3B:
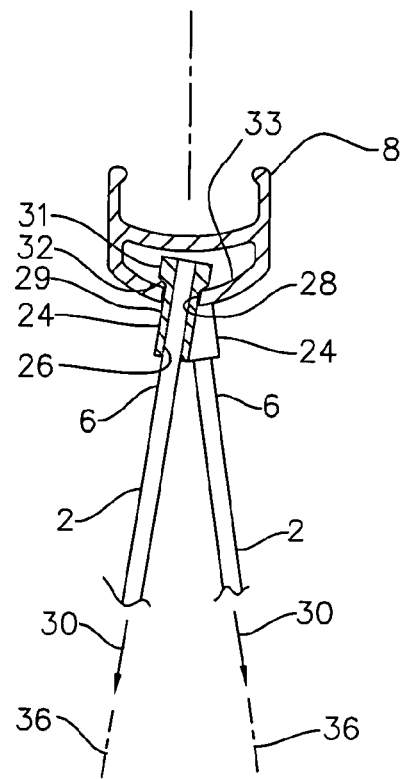

FIG. 3a shows a bicycle wheel 7 constructed with fiber reinforced spokes. This figure is shown to provide a generic assembly to illustrate an arrangement wherein the present invention may be adapted to utilization in bicycle wheel construction. The bicycle wheel 7 includes spokes 2, hub 14, rim 8, and tire 10. The hub 14 includes hub flanges 16 and axle 9. The rim 8 includes geometry for mounting of a tire 10 and a multiplicity of spoke holes 28 in its spoke bed wall 33, each to accept an individual collar 24. The fiber reinforced spokes 2 are connected at their first end 4 to their associated hub flange 16 and at their second end 6 to the rim 8. To create a solid connection between the spoke 2 and the rim 8, the second end 6 of each fiber reinforced spoke 2 is first connected to a corresponding collar 24 in by means of a welded connection as described variously within the instant disclosure. The collar 24 is welded, and thereby integrally joined, to the second end 6 of the spoke 2 by means of one of the embodiments of the present invention to create a welded interface 26. The collar 24 includes a shank portion 29, a head portion 31, and a transition surface 32 therebetween. FIG. 3b is a detail of the embodiment described in FIG. 3a and shows the rim 8 in cross-section. As shown in FIG. 3b, shank potion 29 is extended through spoke hole 28, with transition surface 32 bearing against the radially outboard surface of the spoke bed wall 33 in an overlie engagement, which provides blocking to resist spoke tension 30. Note that the span of spoke 2 is aligned in the direction of spoke tension 30, including a tensile axis 36 that is aligned in the direction of spoke tension 30 and extends through the centerline of the spoke 2. FIG. 3a shows that several spokes of the wheel 7 may be terminated at the rim 8 in this manner. The collar 24 may alternatively be connected to the first end 4 of the spoke 2 for connection to the hub 14. For simplicity in describing this embodiment, only rim 8 connection arrangements are shown herein, with the understanding that these embodiments may be easily adapted to hub connections as well.

It is understood that FIGS. 3a-b correspond to a simplified arrangement for illustration purposes. Most, if not all of the embodiments of the present invention may be applied to this arrangement, as well as arrangements which include facility for creating and/or adjusting spoke pre-tension, as described in FIGS. 2a-c.

FIGS. 4a-c describe an embodiment where a collar 40 is welded to the second end 6 of a spoke 2. Collar 40 is made of thermoplastic polymer material, preferably with fiber reinforcement, and includes a cavity or hole 42 and a longitudinal slot 45 as shown. The diameter of hole 42 is sized to correspond to the diameter of the second end 6 of spoke 2, permitting the second end 6 to easily assemble within hole 42. Spoke 2 has a tensile axis 36 and is constructed of a thermoplastic polymer resin matrix with fiber reinforcement as described herein above, such that the matrix resin surrounds the outer surface of the fibers to provide a readily weldable outer surface 66. As shown in FIG. 4a, second end 6 is inserted into hole 42 in direction 44 in an overlapping sleeve arrangement. As shown in FIG. 4b, collar 40 is located in a nest 43 and an energized ultrasonic horn 46 is pressed against collar 40 in the direction 48, which is shown to be generally perpendicular to the tensile axis 36 and outer surface 66 of the spoke. Slot 45 permits the collar 40 to flex in the direction 48, thereby facilitating the requisite ultrasonic vibration of the collar 40 to create heat and welding at its interface with the spoke 2. With the second end 6 inserted in hole 42, ultrasonic energy supplied by the horn 46 causes the second end 6 and the collar 40 to melt simultaneously and become welded at the welded interface 47 where their surfaces contact. Slot 45 also allows collar 40 to flex during welding to permit the ultrasonic energy to penetrate more effectively to the welding interface 47 between the outer surface 66 of the spoke 2 and the sidewalls of the hole 42. As shown in FIG. 4c, slot 45 becomes closed and welded together during welding at welded interface 49.

It should be understood that the embodiment of FIG. 4a-c is not limited to spokes of round cross-section as shown here.

Any cross-sectional shape of the spoke may be employed. It is usually preferable that the geometry of the second end 6 of the spoke 2 is generally matched to the hole 42 of the collar 40. Further, the slot 45 is merely representative of a weakened region of the collar 40. Other configurations that create a weakened region are anticipated, including a thinned region or a perforated region or a flexure, etc.

It should be noted that, during welding, the material of one element is softened and fused with the material of the element to be joined, thus creating a robust connection. As with most welding processes, it is often preferable that the two components to be welded have similar melting temperatures so that both will melt or soften simultaneously to allow them to blend and fuse at the welded interface. Thus it is usually preferable that the melting temperatures of the two parts be within 40° F. of each other. In general, the ultrasonic welding process tends to focus the mechanical energy of vibration very effectively on the welding interface, however, there is additional heat that dissipates throughout the parts to be welded and can sometimes soften these parts, which may result in some deformation during the welding process. Where feasible, for purposes of providing a graphical representation of a welded interface, the welded interface is usually indicated as a dotted line in drawings throughout this disclosure.

FIGS. 5a-b shows a series of cross-sectional views, cut in a direction generally perpendicular to the tensile axis 36 of the spoke 2 that describe the welded assembly of FIGS. 4a-c in greater detail. FIG. 5a roughly corresponds to the sequence of FIG. 4b, however shown here without the ultrasonic welding horn in place. As shown in FIG. 5a, the second end 6 of spoke 2 is loosely assembled within the hole 42 and slot 45 is open. Slot 45 includes adjacent surfaces 50a and 50b. FIG. 5b roughly corresponds to the sequence of FIG. 4c and shows the assembly of the spoke 2 with the collar 40 after welding via the ultrasonic horn (not shown here). The outer surface 66 of the second end 6 of the spoke 2 is now welded to the inner surface of the hole 42 of collar 40 at welded interface 47, as indicated by dotted lines. Further, the collar 40 and second end 6 are compressed and deformed or "squashed" slightly in the direction 48, which corresponds to the direction of compression via the ultrasonic horn (not shown). The outer surface 66 of the second end 6 and the inner surface of the hole 42 are now matched and welded together. Further, the surfaces 50a and 50b are likewise compressed together and welded at welded interface 49, as indicated.

FIGS. 6a-b describe a welded assembly very similar to that described in FIGS. 5a-b, however this embodiment does not include the slot 45 as previously described. As shown in FIG. 6a, the second end 6 of spoke 2 has an outer surface 66 and is loosely assembled within the cavity or hole 54 of collar 52. Collar 52 is made of thermoplastic polymer material, and completely surrounds the cross section of the spoke 2. FIG. 6b roughly corresponds to the sequence step of FIG. 4c and shows the assembly of the spoke 2 with the collar 52 after welding via the ultrasonic horn (not shown). The outer surface 66 of the second end 6 of the spoke 2 is now welded to the inner surface of the hole 42 of collar 40 at welded interface 56. Further, the collar 52 and second end 6 are compressed and deformed or "squashed" slightly in the direction 48, which corresponds to the direction of compression via the ultrasonic horn (not shown). The outer surface of the second end 6 and the inner surface of the hole 42 are now matched and welded together.

The single collars 40 and 52 of the embodiments of FIGS. 5a-b and 6a-b generally surround the cross section of the spoke. In contrast, FIGS. 7a-f describe an embodiment where the spoke 2 is welded to a two-piece collar, which is composed of a collar base 58 and collar cap 60, each of which partially surround the cross section of the spoke 2. These figures show the parts in cross section generally perpendicular to the longitudinal axis of the spoke 2. FIG. 7a shows the spoke 2 being assembled to the collar base 58 in a direction 62 that is generally perpendicular to the outer surface and longitudinal axis (not shown) of the spoke 2. Collar base 58 includes faces 63a and 63b as well as concave surface 64, which is matched to receive the outer surface 66 of the spoke 2. Concave surface 64 may be considered as a cavity with an open sidewall portion. The collar base 58 is temporarily braced against a welding nest 68 during welding, as shown in FIG. 7b. With the outer surface 66 of the spoke 2 nested in the concave surface 64 of the collar base 58, as shown in FIG. 7b, an ultrasonic welding horn 67 is pressed against the spoke 2 in the direction 62, which is generally perpendicular to the outer surface 66, and ultrasonic energy is transmitted to effect welding between the spoke 2 and the collar base at welded interface 65 where the surfaces contact. FIG. 7c shows the spoke 2 welded to the collar base 58 at welded interface 65. FIG. 7d shows the collar cap 60 being assembled in the direction 62 to the previously welded assembly of the collar base 58 and the spoke 2. Collar cap 60 includes faces 71a and 71b as well as a concave surface 70 that is matched to receive the outer surface 66 of the spoke 2. Next, FIG. 7e shows a second welding horn 72 pressed against the collar cap 60 in the direction 62, while the collar base 58 is nested within the welding nest 68. Ultrasonic energy is then transmitted through the welding horn 72 to weld the collar cap 60 to both the spoke 2 and the collar base 58. As shown, the outer surface 66 of the spoke 2 is now welded to the concave surface 70 of the collar cap at welded interface 69 and the faces 63a and 63b of the collar base 58 are now welded to their mating faces 71a and 71b of the collar cap 60 at welded interfaces 73a and 73b. As shown in FIG. 7f, a welded and fully integral assembly is thus created between the spoke 2 and the two-piece collar (comprised of the collar base 58 and collar cap 60). Spoke 2 is sandwiched by collar base 58 and collar cap 60. Note that the combination of the collar base 58 and collar cap 60 now fully surround the cross section of the spoke 2. It should also be noted that welded interfaces 65, 69, 73a, and 73b are achieved in two welding steps. Of course it is envisioned that these welds may be achieved simultaneously in a single welding step, however the two-step welding process will often provide greater control and reliability of the welded interfaces.

Figure 8A:
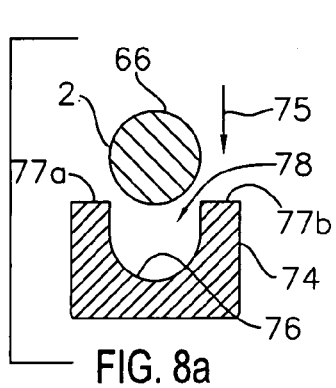
FIG. 8a is a cross-sectional view, taken perpendicular to the tensile axis, of an embodiment of the present invention, and showing the spoke and collar prior to their assembly.
Figure 8B:
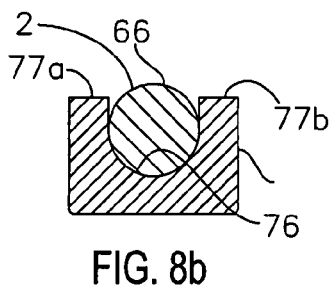
FIG. 8b is a cross-sectional view, taken perpendicular to the tensile axis, of the embodiment of FIG. 8a, and showing the spoke as pre-assembled and nested within the collar.
Figure 8C:
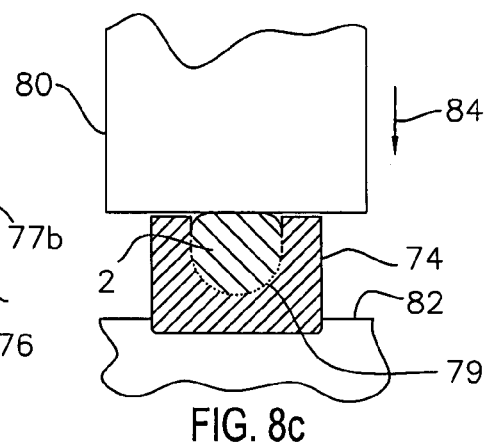
FIG. 8c is a cross-sectional view, taken perpendicular to the tensile axis, of the embodiment of FIG. 8b, and showing the spoke being welded to the collar with an ultrasonic welding horn.

FIGS. 8a-c describe an embodiment similar to the embodiment of FIGS. 7a-f, but without a collar cap. Collar 74 includes channel 78 with concave surface 76, which is matched to the outer surface 66 of the spoke 2. Collar 74 also includes faces 77a and 77b. As shown in FIG. 8a, spoke 2 is assembled to collar 74 in the direction 75, which is generally perpendicular to the longitudinal axis (not shown) of the spoke 2. The spoke 2 is nested within channel 78 such that the outer surface 66 is in contact with the concave surface 76 as shown in FIG. 8b. As shown in FIG. 8c, this loose assembly is located within a nest 82 and an ultrasonic welding horn 80 is pressed against the spoke 2 in direction 84, which is generally perpendicular to the outer surface 66, to effect welding between the outer surface 66 of the spoke 2 and the concave surface 76 of the collar 74 at the welded interface 79. Note that the heat and pressure provided by the horn 80 serves to deform the spoke 2 slightly and the cross section of the spoke is shown to be squashed and distorted to more closely follow the contour of the channel 78. A welded and fully integral assembly is thus created between the spoke 2 and the collar 74. Although the collar 74 does not fully surround the cross section of the spoke 2, as described in previous embodiments, a firm connection between the two elements is nevertheless obtained.

Figure 9A:
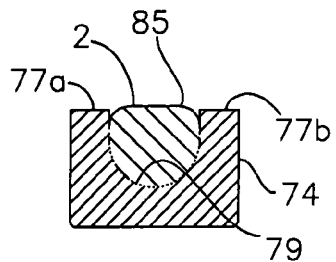
FIG. 9a is a cross-sectional view, taken perpendicular to the tensile axis, of an embodiment of the present invention, and showing the welded assembly of FIG. 8c.
Figure 9B:
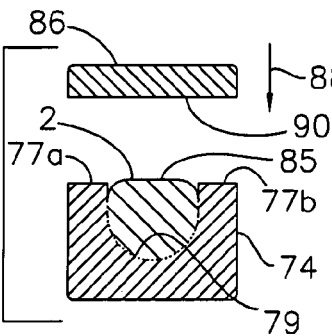
Figure 9C:
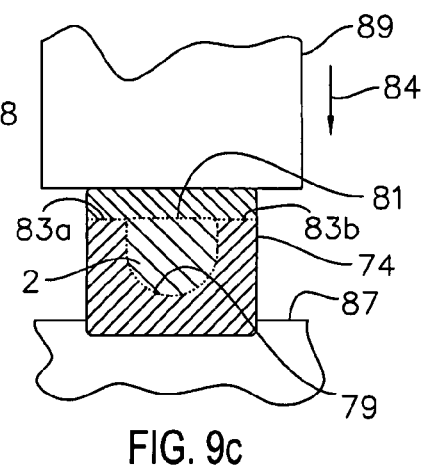
FIG. 9c is a cross-sectional view, taken perpendicular to the tensile axis, of the embodiment of FIG. 9b, and showing the cover being welded to the assembly of FIG. 9a with an ultrasonic welding horn.
Figure 9D:
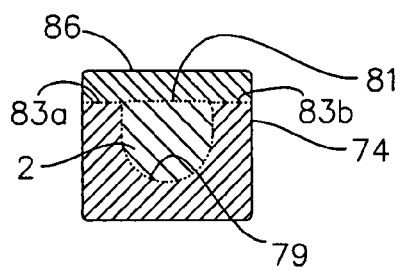

FIGS. 9a-c describe an embodiment similar to the embodiment of FIGS. 8a-c and the embodiment of FIGS. 7a-f, however this embodiment includes a cover 86 in place of the collar cap 60. FIG. 9a is roughly equivalent to FIG. 8c, with the nest 82 and horn 80 removed, and shows the spoke 2 welded to the collar 74 as previously described, including an exposed surface 85 of the spoke 2. As shown in FIG. 9b, cover 86 includes underside surface 90 and is assembled in the direction 88 to the previously welded assembly of FIG. 9a. With collar 74 located in nest 87, ultrasonic welding horn 89 is pressed against the cover 86 in direction 84, which is generally perpendicular to the exposed surface 85 of the spoke 2, to effect welding between the underside surface 90 of the cover 86 and the exposed surface 85 of the spoke 2, resulting in welded interface 81, as shown in FIG. 9c. Simultaneously, the underside surface 90 of the cover 86 is welded to faces 77a and 77b, resulting in welded interfaces 83a and 83b. The fully welded assembly is shown in FIG. 9d. A welded and fully integral assembly is thus created between the spoke 2 and the collar 74 and the cover 86 as shown in FIG. 9d. Note that cover 86, spoke 2 and collar 74 are all further distorted to conform to each other due to this second welding operation, thus creating additional welded surface area of contact between these components. Note also that the cover 86 of FIGS. 9a-d roughly corresponds to the collar cap 60 of FIGS. 7a-f, in that both embodiments utilize a two-piece collar.

Figure 10A:
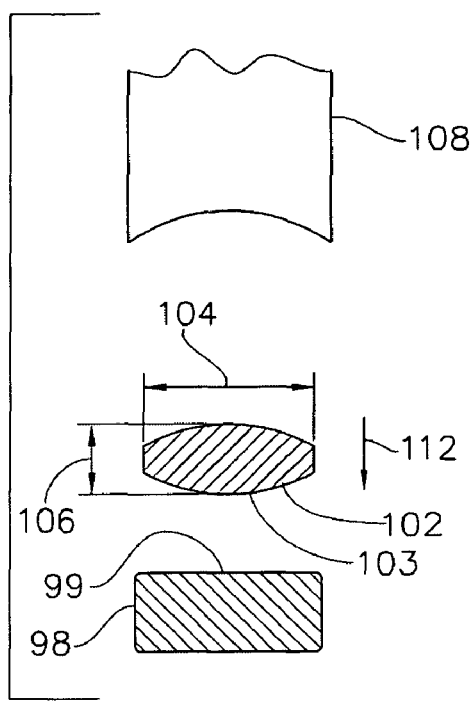
FIG. 10a is a cross-sectional view, taken perpendicular to the tensile axis, of an embodiment of the present invention, and showing the spoke prior to assembly with the collar base.
Figure 10B:
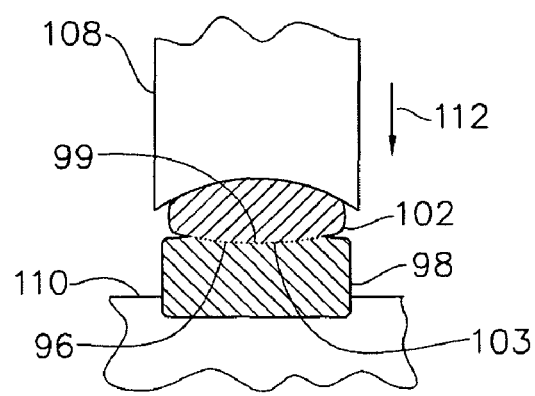
FIG. 10b is a cross-sectional view, taken perpendicular to the tensile axis, of the embodiment of FIG. 10a, and showing the spoke being welded to the collar base with an ultrasonic welding horn.
Figure 10C:
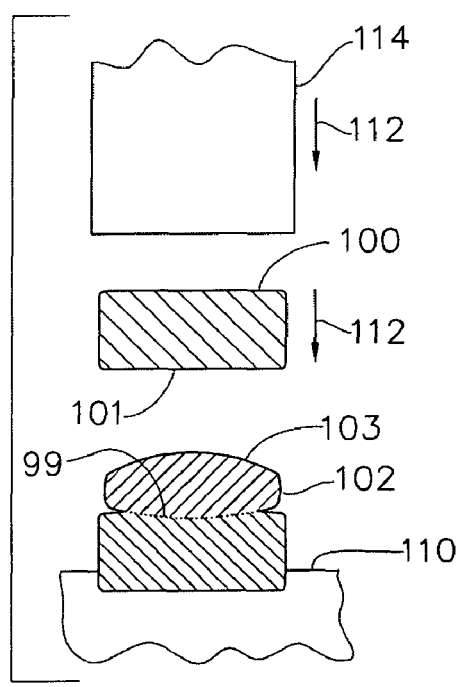
FIG. 10c is a cross-sectional view, taken perpendicular to the tensile axis, of the embodiment of FIG. 10b, and showing a collar cover prior to assembly with the welded assembly of FIG. 10b.
Figure 10D:
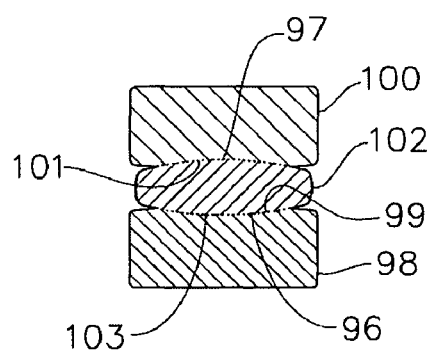
FIG. 10d is a cross-sectional view, taken perpendicular to the tensile axis, of the embodiment of FIG. 10c, and showing the collar cover as welded to the assembly of FIG. 10b.

Most of the previous embodiments describe a collar that employs a concave surface or hole to create a generally matched surface with its mating outer surface of the spoke. However, the collar, or a portion thereof, may be a flat element or one that does not initially have well-matched surface geometry between the spoke and the collar. For example, FIGS. 10a-d describe a sandwich welded embodiment including a spoke 102, a collar base 98 and a collar cover 100. Spoke 102, with outer surface 103, is shown to have a somewhat flattened cross sectional profile with a width 104 greater than its thickness 106. Collar base 98 includes face 99 and collar cover 100 includes face 101. Since the ultrasonic welding assembly process has already been described in detail in previous embodiments, some discussion will be omitted in subsequent embodiments in the interest of brevity. As shown in FIG. 10a, spoke 102 is assembled to collar base 98 in the direction 112 such that outer surface 103 contacts face 99. As shown in FIG. 10b, collar base 98 is supported in nest 110 and ultrasonic horn 108 is pressed against the spoke 102 in the direction 112, which is generally perpendicular to the outer surface 103, to effect welding between the outside surface 103 and face 99 at the welded interface 96 where they contact. Note that both the spoke 102 and the collar base 98 distort somewhat during welding such that outside surface 103 and face 99 are more closely matched. As shown in FIG. 10c, collar cover 100 is then assembled to the spoke 102 in direction 112 such that upward-facing portion of outer surface 103 contacts face 101. Next, ultrasonic horn 114 is pressed against the collar cover 100 to effect welding between the outside surface 103 and face 101 at the welded interface 97 where they contact. Note again that both the spoke 102 and the collar cover 100 distort somewhat during welding such that outside surface 103 and face 101 are more closely matched. The result is a sandwiched welded assembly, shown in FIG. 10d, between the spoke 102, the collar base 98 and the collar cover 100.

Figure 11A:
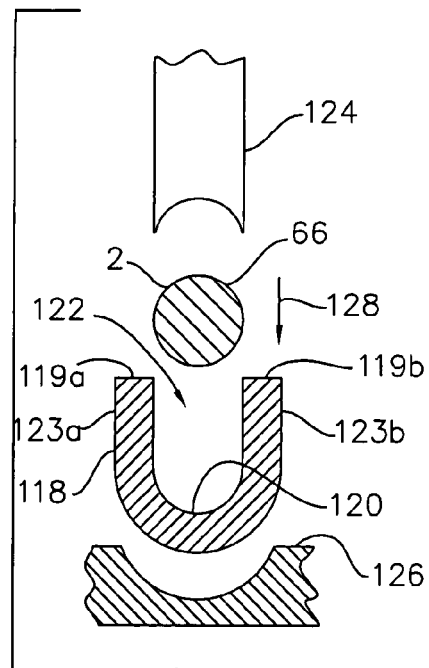
FIG. 11a is a cross-sectional exploded view, taken perpendicular to the tensile axis, of an embodiment of the present invention, and showing the spoke prior to assembly with the collar base, including an ultrasonic welding horn and nest.
Figure 11B:
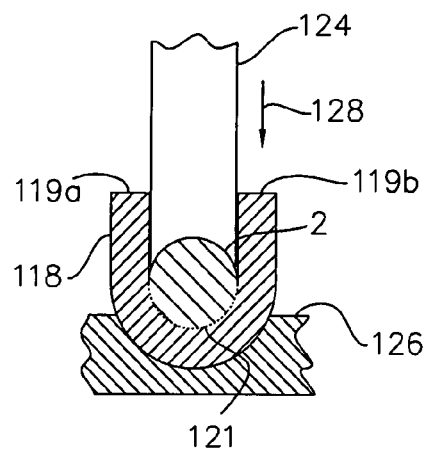
FIG. 11b is a cross-sectional view, taken perpendicular to the tensile axis, of the embodiment of FIG. 11a, and showing the spoke being welded to the collar with an ultrasonic welding horn.
Figure 11C:
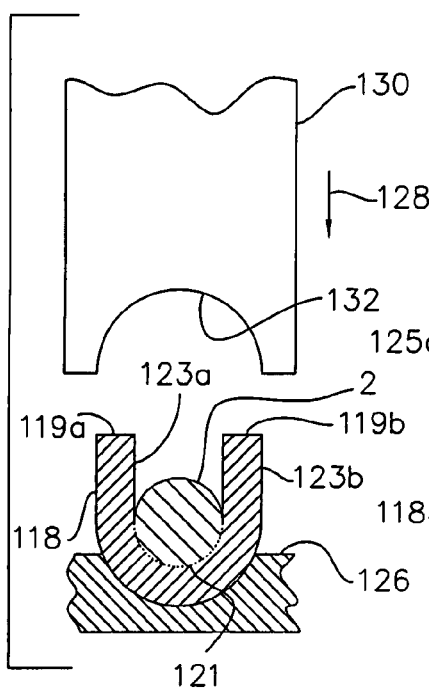
FIG. 11c is a cross-sectional view, taken perpendicular to the tensile axis, of the embodiment of FIG. 11b, and showing an ultrasonic welding horn prior to contact with the assembly of FIG. 11b.
Figure 11D:
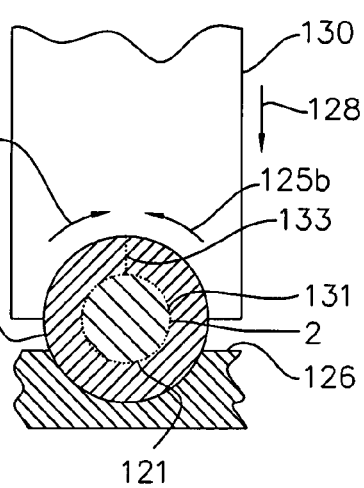
FIG. 11d is a cross-sectional view, taken perpendicular to the tensile axis, of the embodiment of FIG. 11c, and showing the collar being formed and welded to the spoke with an ultrasonic welding horn.
Figure 11E:
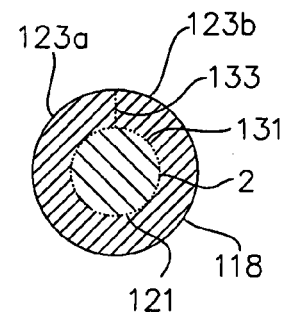
FIG. 11e is a cross-sectional view, taken perpendicular to the tensile axis, of the embodiment of FIG. 11d, and showing the collar as formed and welded to the spoke.

FIGS. 11a-e describe an embodiment that is initially similar to the embodiment of FIGS. 8a-c, however the collar 118 may be configured such that it may be deformed to further match the outer surface spoke. Spoke 2 includes outside surface 66. Collar 118 is generally "U"-shaped and includes cavity or channel 122, concave surface 120, legs 123a and 123b and faces 119a and 119b. FIG. 11a describes the assembly sequence wherein the spoke 2 is first assembled in direction 128 to be located within the channel 122 such that outside surface 66 contacts concave surface 120. As shown in FIG. 11b, collar 118 is located within welding nest 126, which is contoured to match the outer surface of the collar 118. An energized ultrasonic horn 124 is then pressed against the spoke 2 in direction 128, which is generally perpendicular to the outer surface 66, to effect welding between the outside surface 66 and concave surface 120 at the welded interface 121 where they contact. Next, a second ultrasonic horn 130 with a concave surface 132 is pressed against the previously welded assembly of FIG. 11b in the direction 128, as shown in FIGS. 11c-d, which cause the collar 118 to deform, with legs 123a and 123b wrapping around the cross section of the spoke 2 in the corresponding directions 125a and 125b as shown. Thus, the previously non-welded portion of the channel 122 is now contacting and welded to the outer surface 66 of the spoke 2 at welded interface 131. Further, surfaces 119a and 119b are now butted and welded together at welded interface 133. The result is a wrapped and welded assembly, shown in FIG. 11e, between the spoke 2 and the collar 118, where the collar now fully surrounds the cross section of the spoke.

Figure 12A:
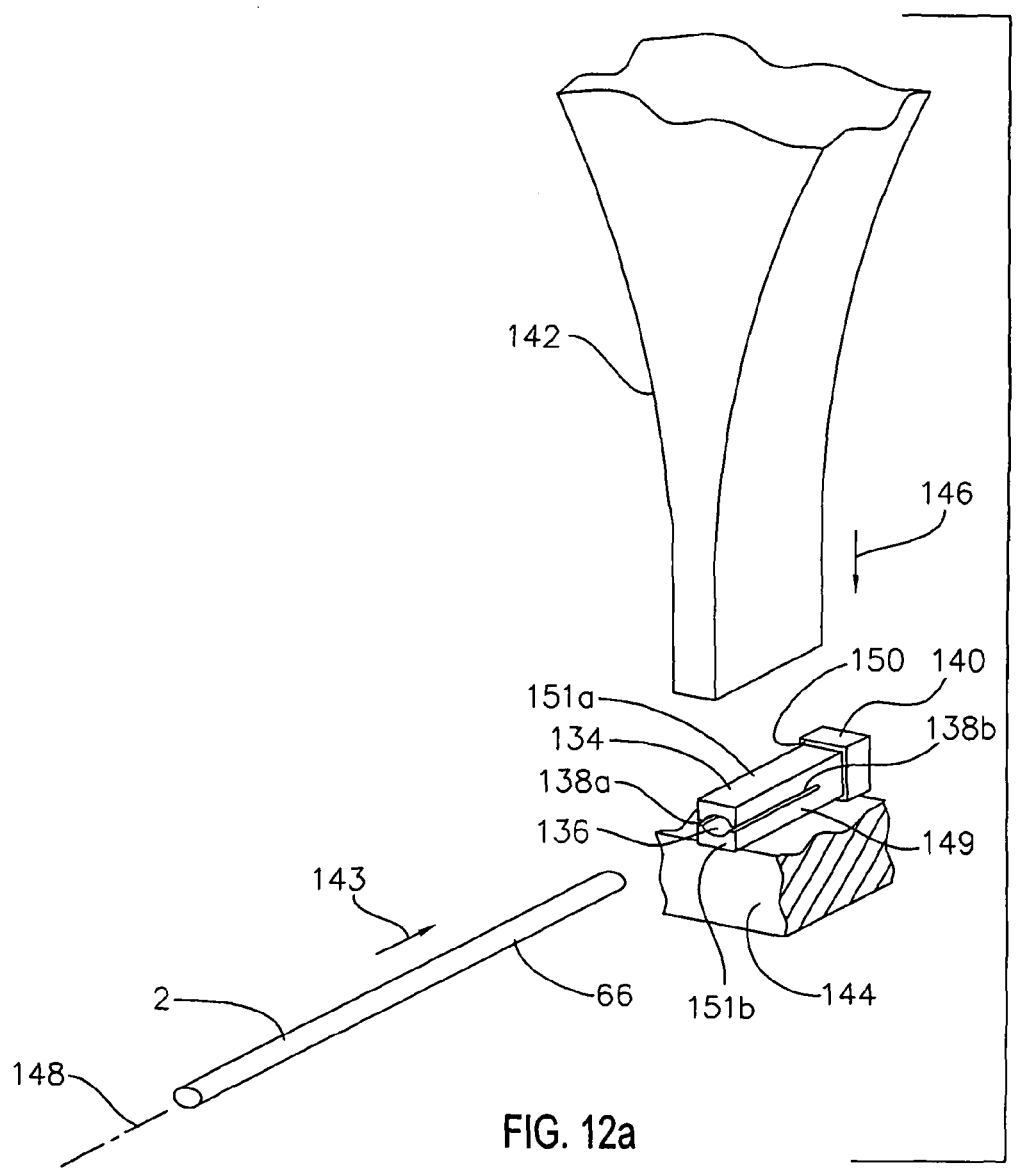
FIG. 12a is a partial perspective exploded view of an embodiment of the present invention, and showing the spoke prior to assembly with a slotted collar, including an ultrasonic welding horn and nest.
Figure 12B:
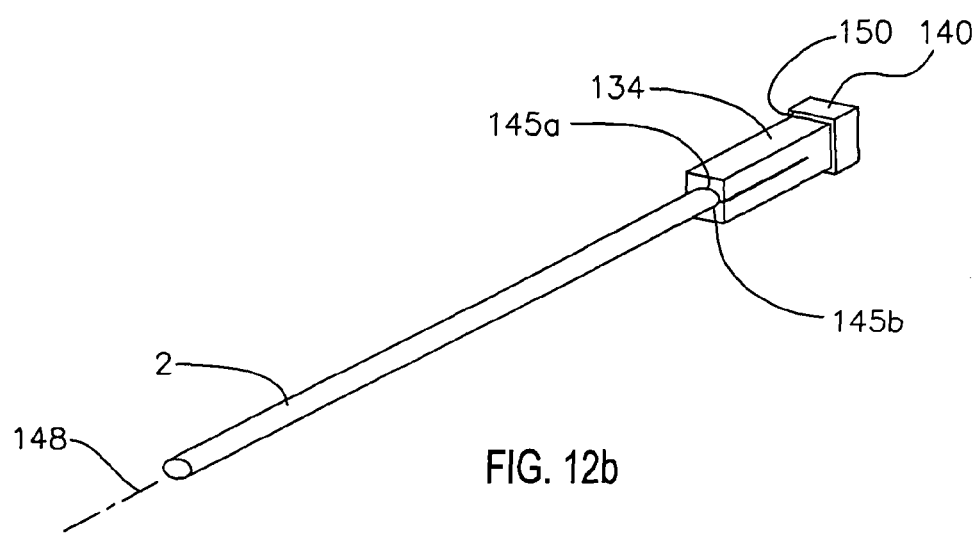
FIG. 12b is a partial perspective exploded view of the embodiment of FIG. 12a, and showing the spoke as welded to the slotted collar.

FIGS. 12a-b describe an embodiment similar to that described in FIGS. 7a-f, however the collar base and the collar cap are shown here to be connected together as a single element, independent of the spoke. Collar 134 includes cavity 136 to accept spoke 2 and longitudinal slots 138a and 138b that extend in a direction generally parallel to the longitudinal axis 148 of the spoke 2. Collar 134 also includes a shank portion 149 and an enlarged head portion 140, with a transition surface 150 therebetween. Spoke 2 includes outer surface 66 and longitudinal axis 148, which extends generally longitudinally along the length of the spoke 2. As shown in FIG. 12a, spoke 2 is inserted within cavity 136 in the direction 143. Collar 134 is then positioned on the welding nest 144 and an ultrasonic welding horn 142 is pressed, in the direction 146, against the shank 149 of the collar 134. Slots 138a and 138b serve to partially split the shank 149 of the collar 134 into two shank portions 151a and 151b, creating flexures that allow the shank portions 151a and 151b to move independently for effective energy transmission when subject to the ultrasonic vibration induced by the horn 142. In this manner, slots 138a and 138b function similarly to slot 45 of FIGS. 4a-c. In this respect, this embodiment is also similar to the embodiment of FIGS. 4a-c. When the horn 142 is energized, the cavity 136 is effectively welded to the outer surface 66 of the spoke 2 at welded interfaces 145a and 145b, for a positive integral connection between the collar 134 and the spoke 2, as shown in FIG. 12b. Spoke 2 is sandwiched between shank portions 151a and 151b. It should be noted that, depending on the geometry involved, the slots 138a and 138b may also be welded closed in this welding operation in a manner similar to that described in FIGS. 4a-c and FIGS. 5a-b.

Figure 13C:
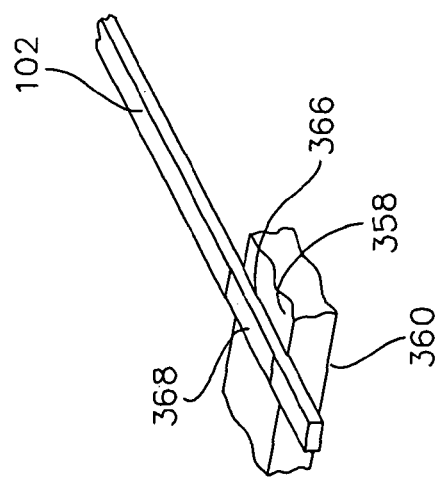
FIG. 13c is a partial perspective exploded view of the embodiment of FIG. 13b, and showing the spoke as welded to the flat base.
Figure 13B:
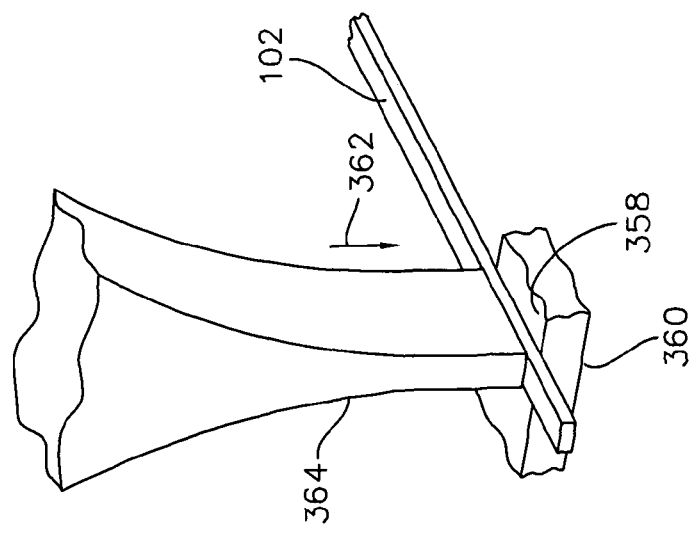
FIG. 13b is a partial perspective exploded view of the embodiment of FIG. 13a, and showing the spoke being welded to the flat base.
Figure 13A:
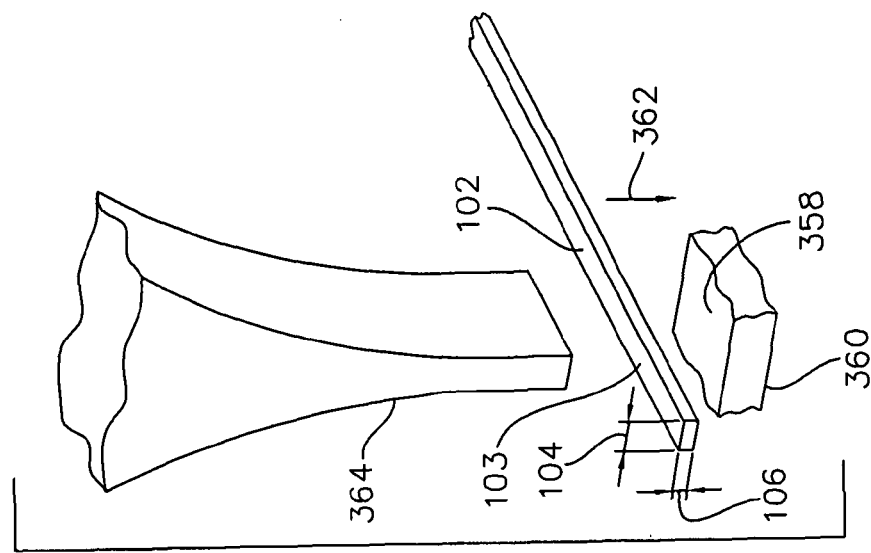
FIG. 13a is a partial perspective exploded view of an embodiment of the present invention, and showing the spoke prior to assembly with a flat base, including an ultrasonic welding horn.

FIGS. 13a-b describe an embodiment similar to that described in FIGS. 10a-b, however this embodiment utilizes only a single overlapping welded interface. Spoke 102, with outer surface 103, is shown to have a somewhat flattened cross sectional profile with a width 104 greater than its thickness 106. Base 360 includes face 358 and is shown to be a larger element than the collar of several of the embodiments previously described. As shown in FIG. 13a, spoke 102 is assembled to base 360 in the direction 362 such that outer surface 103 contacts face 358. As shown in FIG. 13b, ultrasonic horn 364 is pressed against the spoke 102 in the direction 362, which is generally perpendicular to the outer surface 103, and energized to effect welding between the outside surface 103 of the spoke 102 and face 358 of the base at welded interface 366. As shown in FIG. 13c, the result is an overlapped welded assembly between the spoke 102 and the base 360 in a manner that is roughly equivalent to a spot weld commonly utilized in sheetmetal construction. Note also the imprint 368 left by the horn 364 on the outer surface 103 of the spoke 102. Such an imprint or localized distortion of the surface is sometimes a necessary by-product of the heat and pressure involved in the welding process.

Figure 14A:
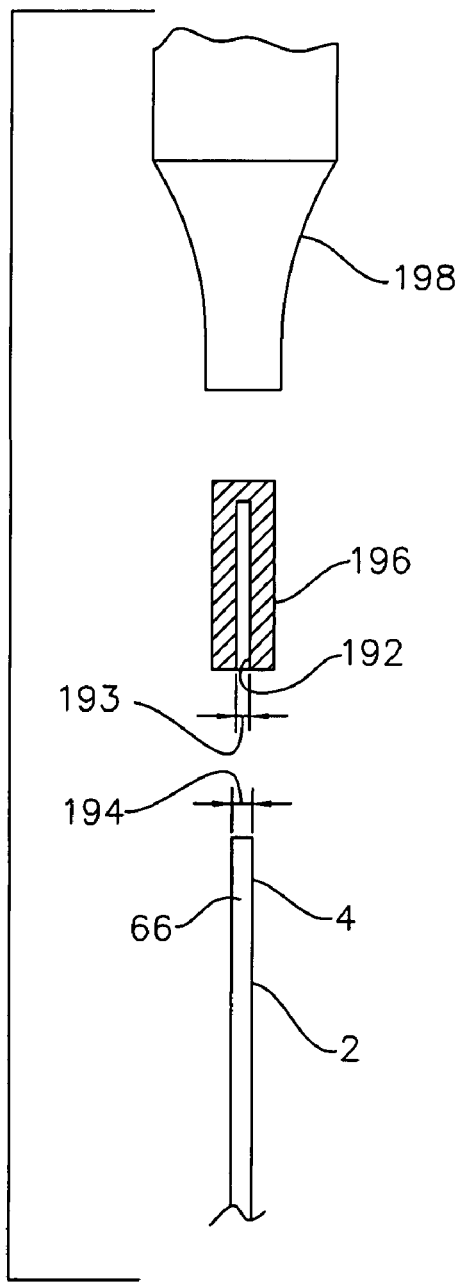
FIG. 14a is a cross-sectional exploded view, taken perpendicular to the tensile axis, of an embodiment of the present invention, and showing the spoke prior to assembly with a collar, including an ultrasonic welding horn.
Figure 14B:
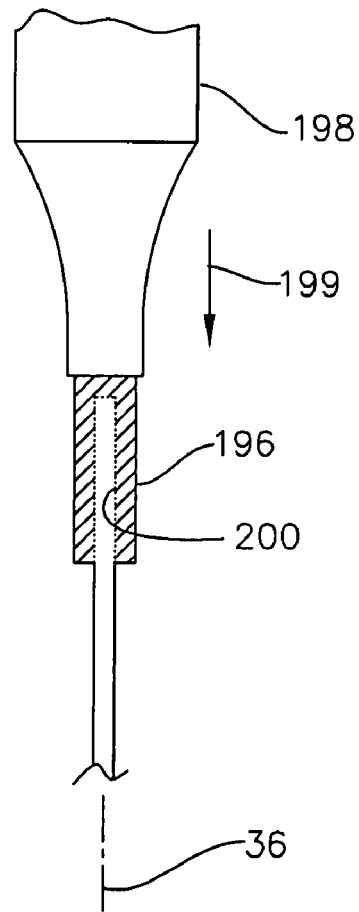
FIG. 14b is a cross-sectional exploded view, taken perpendicular to the tensile axis, of the embodiment of FIG. 14a, and showing the spoke being welded to the collar, including an ultrasonic welding horn.

In contrast to the previous embodiments where the welding process includes welding pressure applied in a direction perpendicular to the longitudinal axis or outer surface of the spoke, it is also possible to create a viable weld with welding pressure applied in a direction generally parallel to the longitudinal axis or outer surface of the spoke, as shown in the embodiment of FIGS. 14a-b. FIGS. 14a-b describe an embodiment where mechanical energy is utilized to weld a preformed collar 196 to the first end 4 of a spoke 2. The components are shown in FIG. 14a prior to assembly. Collar 196 includes hole 192 that is sized to be slightly smaller in diameter 193 than the mating diameter 194 of the first end 4 of the spoke 2 to create an interference fit between the two components. Collar 196 is made of a thermoplastic polymeric material, preferably including reinforcement fibers. Spoke 2 is preferably constructed of a thermoplastic polymer resin matrix with fiber reinforcement. It is preferable that both the preformed collar 196 and the spoke 2 are made from identical or otherwise chemically compatible matrix resins with similar melting temperatures.

As shown in FIG. 14b, an ultrasonic horn 198 is then excited with ultrasonic energy and pressed against the collar 196, driving collar 196 in the direction 199. The ultrasonic energy transmitted by the horn 198 causes both the hole 192 of the collar 196 and the outer surface 66 of the spoke 2 to simultaneously melt at the interface where they contact, permitting the two components to fit together and become welded at the welded interface 200. In a welded assembly, the adjoining materials of the two welded components deform to flow and become fused together. Such ultrasonically welded assembly of interfering cylindrical components is well known in industry and is commonly referred to as a "shear weld". Alternatively, other welding methods may be utilized, such as spin-welding or other processes known in industry. In the case of spin welding, the collar 196 would be rotated about the tensile axis 36, relative to the spoke 2, to create frictional heat to melt these mating surfaces and weld them together. The result is a welded connection between the collar 196 and the spoke 2 to create an enlarged collar for termination of the spoke 2. The collar 196 may then be connected to a bracing element in any manner commensurate with the desired application. As an example, the spoke may then be connected to a bracing element in a manner as described in FIGS. 16a-b.

Figure 15A:
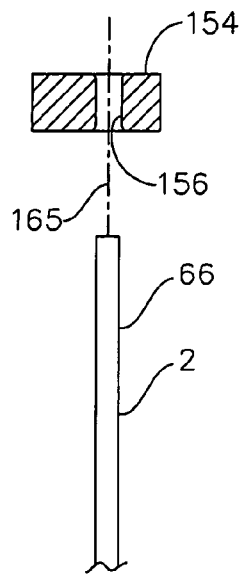
FIGS. 15a-d are cross sectional views, taken perpendicular to the tensile axis, of an embodiment of the present invention, showing a progression of steps to achieve a welded assembly between the spoke and an anchor, including: presenting the spoke to the anchor as shown in FIG. 15a, passing the spoke through a hole in the anchor as shown in FIG. 15b, bending the spoke to match the anchor as shown in FIG. 15c, and welding the bent portion of the spoke to the anchor with an ultrasonic horn as shown in FIG. 15d.
Figure 15B:
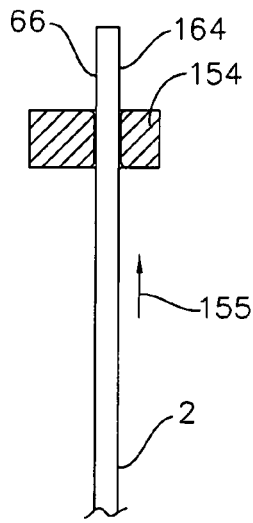
Figure 15C:
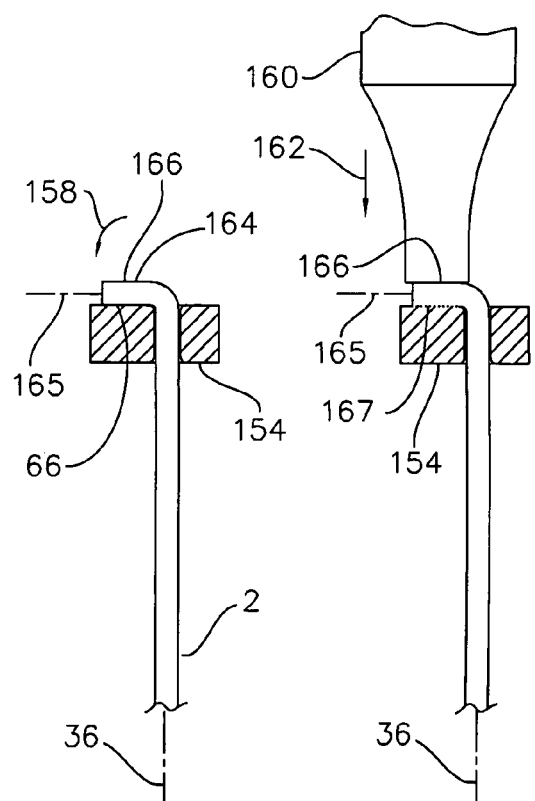
Figure 15D:
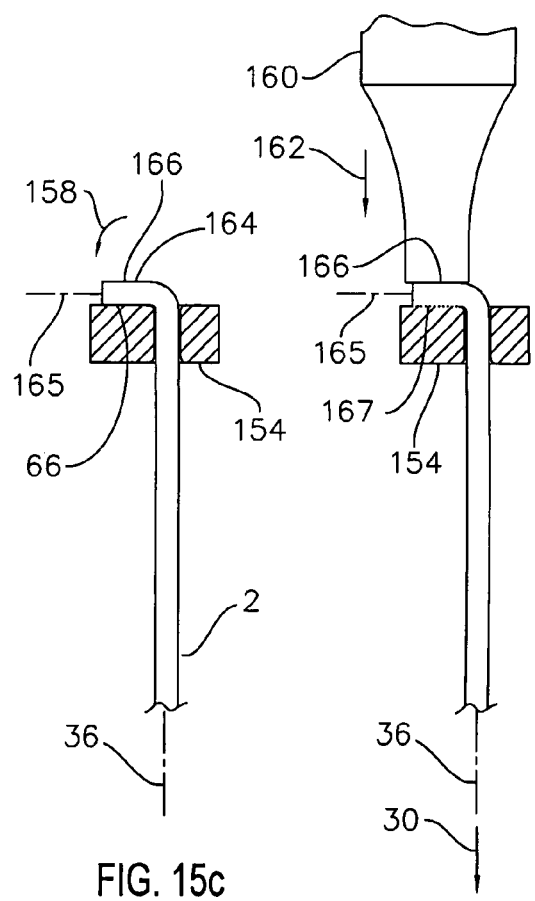

FIGS. 15a-d describe an embodiment similar to the embodiment of FIGS. 13a-c, however the spoke is shown to be bent or deflected at an angle from the tensile axis 36 and welded to its anchor point in this bent region. This represents an example where the longitudinal axis 165 of the spoke 2 is bent to deviate from the tensile axis 36 of the spoke 2. Anchor 154 includes hole 156 that is sized to accept the spoke 2. Spoke 2 includes longitudinal outer surface 66. As shown in FIGS. 15a-b, spoke 2 is inserted through hole 156 in the direction 155 to create an extended portion 164. The extended portion 164 is then bent in direction 158 to form the bent portion 166, as shown in FIG. 15c. Anchor 154 is temporarily supported by a welding nest (not shown) during welding. Ultrasonic welding horn 160 is then pressed in direction 162 against the bent portion 166 as shown. In the example shown here, direction 162 is generally perpendicular to the sidewall surface 66 of the spoke, but also generally parallel to the tensile axis 36 of the spoke 2. Thus the energized horn 160 causes the bent portion 166 to be welded to the anchor 154 at the welded interface 167, thereby creating a firm connection between the two. The welding process shown here is an overlapping weldment similar to that described in FIGS. 13a-c. Spoke 2 is now anchored to the anchor 154, which may serve as a bracing element to resist spoke tension 30. It should be noted that the bent region 166 may be considered to be a deflection or a laterally extended portion of the spoke 2 from its tensile axis 36. In this embodiment, the spoke 2 and its longitudinal axis 165 is deflected with a 90-degree angle in the bent region 166, however a wide range of deflection angles and/or offset extension geometries may be utilized in the present invention.

Figure 16A:
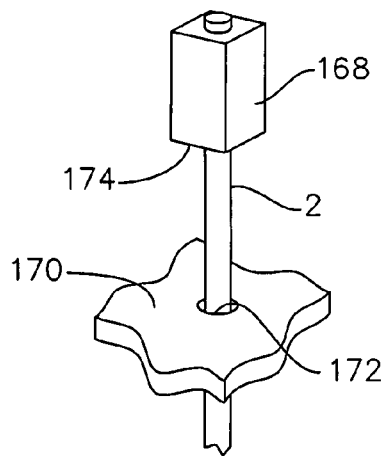
FIG. 16a is a partial perspective exploded view of an embodiment of the present invention, and showing the spoke passing through a hole in a bracing element, including a collar joined to the spoke.
Figure 16B:
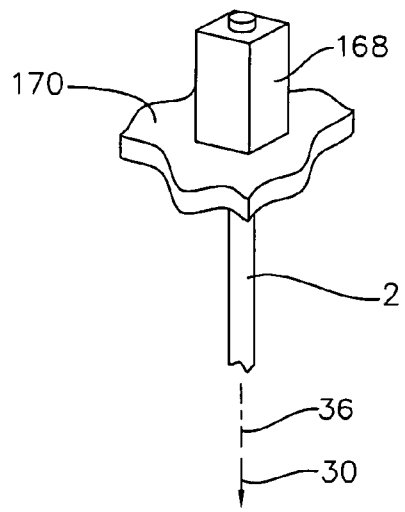
FIG. 16b is a partial perspective exploded view of the embodiment of FIG. 16a, and showing the collar with an overlie engagement between the collar and the bracing element.

FIGS. 16a-b describe one example of how a linear tensile element, such as a spoke, may be anchored against a bracing element. Spoke 2 includes collar 168 connected thereto, with downward facing bearing surface 174. It may be viewed that collar 168 serves as an enlarged portion to the spoke 2 and bearing surface 174 serves as a transition surface. There are several embodiments disclosed herein that describe means for connecting an anchoring element, such as collar 168, to the spoke 2, several of which may be applied to the embodiments described herein. Bracing element 170 includes hole 172, through which the spoke 2 is extended to pass. The bracing element 170 is representative of the spoke bed of a rim or of a hub flange to which the spoke 2 is connected. With the application of spoke tension 30 along tensile axis 36, the spoke is drawn down so that bearing surface 174 overlies and bears against bracing element 170. Thus the spoke 2 is firmly anchored against the bracing element 170 via the collar 168. Of course, any manner of intermediate elements may be utilized between the spoke 2 and the bracing element 170 to optimize the interface between these two components. For example, it may be desirable to incorporate a flat washer between the bearing surface 174 and the bracing element to distribute the tensile loads over a broader surface area of the bracing element 170.

Figure 17:
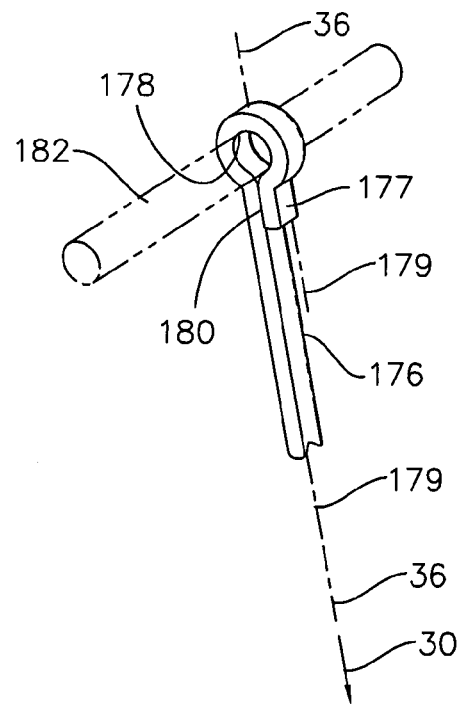
FIG. 17 is a partial perspective exploded view of an embodiment of the present invention, and showing a spoke with looped end, including a bracing element passed through the looped end.

FIG. 17 describes an embodiment where the spoke has a looped end for connection with a bracing element. Spoke 176 includes a looped portion 178 and an over lapped portion 177 where the spoke double-backs to overlap on itself along a portion of its sidewall surface. The spoke 2 is welded to itself at a welded interface 180 that corresponds to the overlapped portion 177. Representative welding methods to achieve this overlapping welded interface have already been described hereinabove, particularly in FIGS. 13a-c and 15a-d. A robust welded connection between the spoke 176 and the looped portion 178 is thus achieved. A rod 182 is passed through the looped portion 178 to anchor the spoke 2 and serve as a representative bracing element to resist spoke tension 30. The longitudinal axis 179 follows the spoke, so that it deviates from the tensile axis 36 in the looped portion 178. While the overlapping weld shown here requires no additional collar element, it is also envisioned that a collar element may alternatively be incorporated into the assembly to reinforce the connection between the overlapped portion 177 and the spoke 176. This embodiment also serves as a representative embodiment to describe a configuration where a spoke may be welded to itself.

Figure 18:
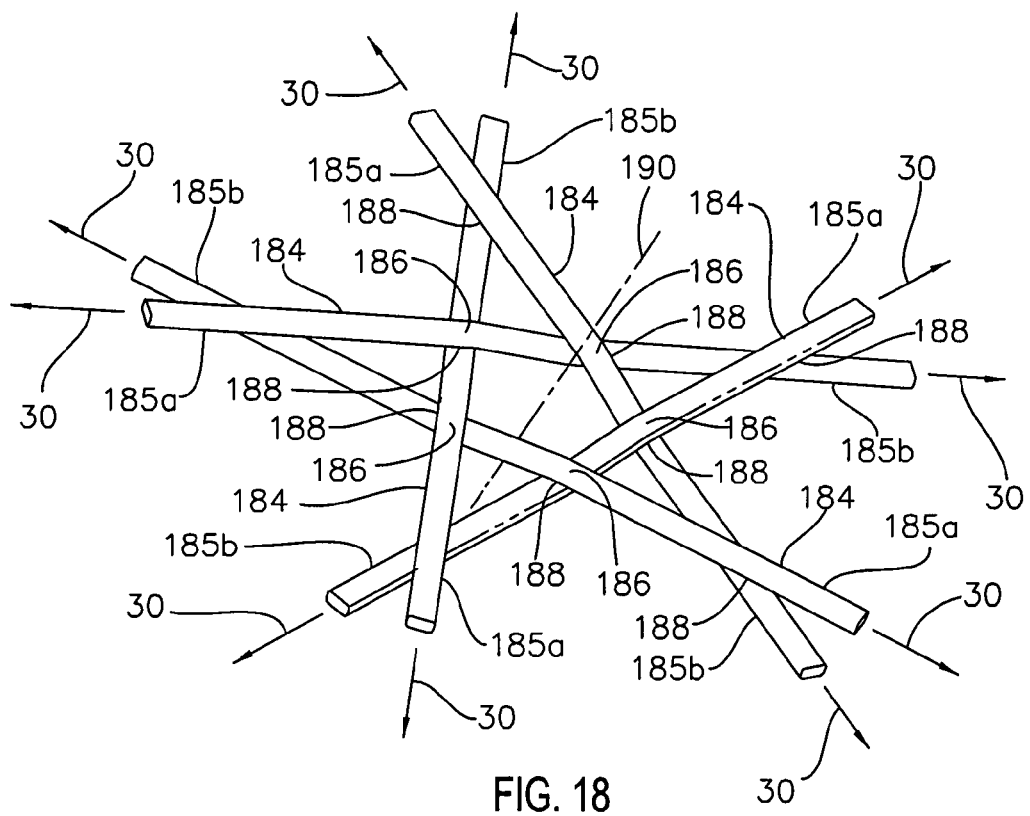
FIG. 18 is a partial perspective exploded view of an embodiment of the present invention, and showing a multiplicity of duplex spokes interlaced, including overlap regions where the duplex spokes are welded to each other.

While FIG. 17 describes a spoke that is welded to itself to create structural anchoring, a spoke may be welded to neighboring spoke(s) to similar effect. As shown in the embodiment of FIG. 18, a series of spokes 184 are of a duplex spoke configuration, each including two spans 185a and 185b that extend between the rim and hub. As shown, a series of five spokes 184 are interlaced to include overlap regions 186 where the spokes 184 cross over each other. The spokes 184 are welded to each other at welded interfaces 188 that correspond with these overlap regions 186. Representative welding methods to achieve this welded interface have been described hereinabove. Thus a daisy-chained series of welded interfaces 188 may be utilized to create a structural ring of connected spokes 184 about an axial central axis 190 to resist spoke tension 30 as shown. In the embodiment of FIG. 18 this structural ring of spokes 184 may be configured to form a portion of a hub flange, thus permitting a very strong and lightweight hub design.

While several of the previous embodiments described a means for anchoring a single end of a spoke, most of the embodiments described herein may alternatively be adapted to create a coupling connection between two (or more) tensile elements. As an example, FIGS. 19a-b describe an embodiment very similar to the embodiment of FIGS. 4a-c, however coupling collar 201 serves to connect two spokes 206a and 206b to each other. Coupling collar 201 includes through hole 202 and slot 204. Spoke 206a is inserted halfway into hole 202 from one end in direction 208a and spoke 206b is inserted halfway into hole 202 from the opposite end in direction 208b as shown in FIG. 19a. With spokes 206a and 206b pre-assembled to coupling collar 201, as shown in FIG. 19b, coupling collar 201 is then welded, in direction 203, in a manner identical to that described in FIGS. 4a-c, to create a firm welded connection between the coupling collar 201 and both spokes 206 a and 206b, at their respective welded interfaces 207a and 207b. Thus, spoke 206a is now coupled and joined to spoke 206b and tension 30 may be carried across this joinder. While coupling collar 201 may be utilized simply as a means for tensile coupling between spokes 206a and 206b, it is envisioned that the coupling collar 201 may additionally be engaged by a bracing element (not shown), such that the coupling collar serves as both a coupling element and an anchoring element.

FIGS. 19c-d describe an embodiment similar to FIGS. 19a-b, however the coupling collar 201 is omitted and spoke 210a is instead directly welded to spoke 210b. Spokes 210a and 210b include a corresponding outer surfaces 211a and 211b. Spoke 210a overlaps spoke 210b in overlap region 212 as shown in FIG. 19c. Spokes 210a and 210b include thermoplastic resin on their corresponding outer surface 211a and 211b and are then directly welded to each other via an ultrasonic welding horn (not shown) in direction 216, which is generally perpendicular to the outer surfaces 211a and 211b, to create a welded interface 214 corresponding to the overlap region 212 as shown in FIG. 19d. A firm connection between spokes 210a and 210b is thus achieved to carry spoke tension 30.

Figure 20A:
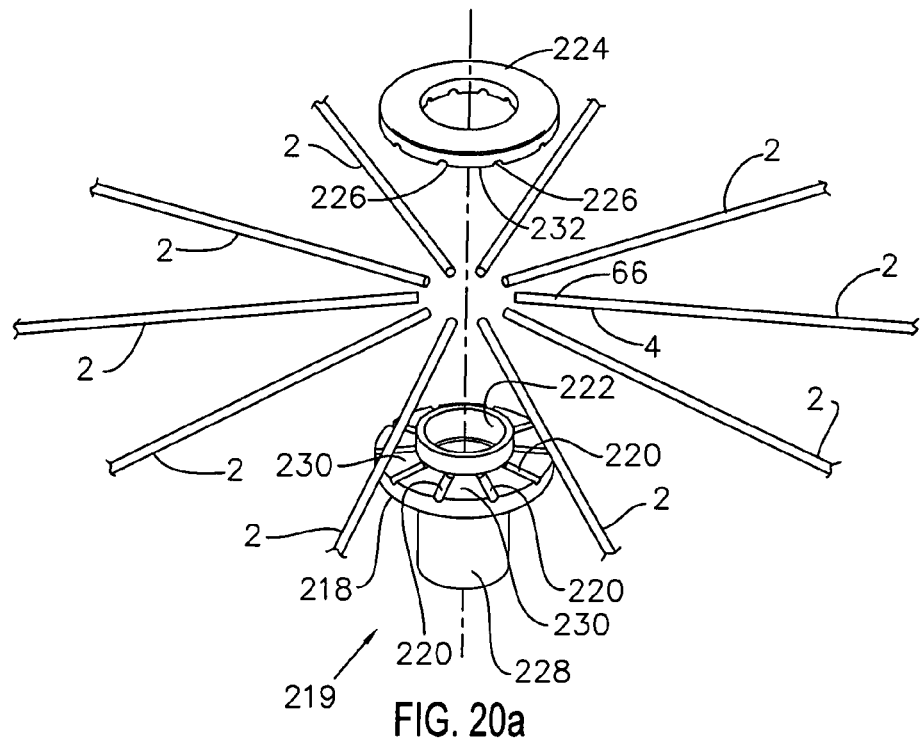
FIG. 20a is a partial perspective exploded view of an embodiment of the present invention, showing a multiplicity of spokes, a hub flange, and a cover.
Figure 20B:
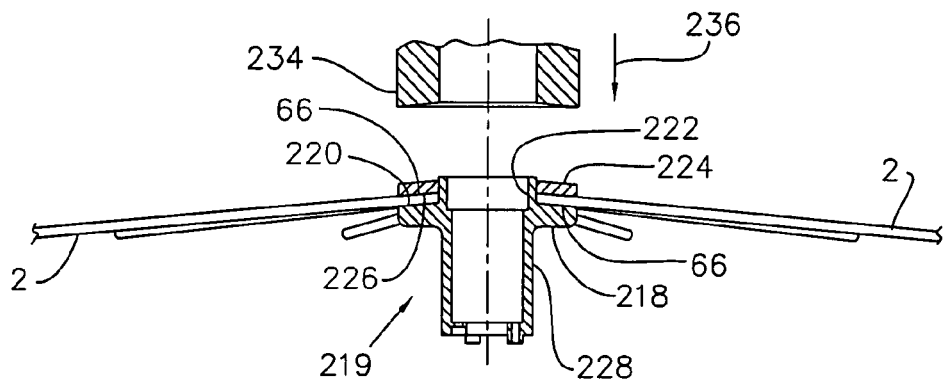
FIG. 20b is a cross sectional view of the embodiment of FIG. 20a, showing the spokes as assembled and sandwiched between the hub flange and cover, immediately prior to welding, including an ultrasonic welding horn.
Figure 20C:
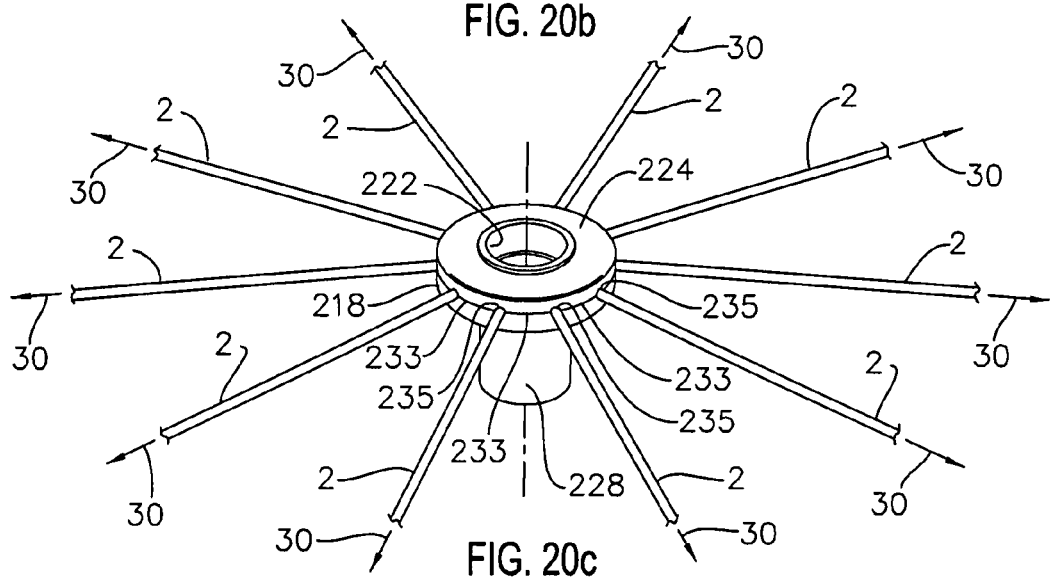
FIG. 20c is a partial perspective view of the embodiment of FIG. 20b, showing the spokes as welded and sandwiched between the hub flange and cover.

FIGS. 20a-c describes a representative embodiment where a multiplicity of spokes are welded to a common connecting element. In this case the common connecting element is a hub flange 218. Hub shell 219 includes a hub flange 218, a bearing bore 222 to accept a bearing (not shown), and a cylindrical body portion 228. Hub flange 218 includes axial face 230 and a multiplicity of concave surfaces 220 that are matched to the outer surfaces 66 of their respective spokes 2 in an arrangement similar to that described in FIGS. 7a-f. A multiplicity of spokes 2 each include an outer surface 66 and a first end 4 that is to be joined to the hub flange 218. Cover 224 is a circular element, including an axial face 232 that is matched to axial face 230 and a multiplicity of concave surfaces 226 that are matched to the outer surfaces 66 of their respective spokes 2. FIG. 20a shows the cover 224, spokes 2 and hub shell 219 in exploded view prior to assembly. FIG. 20b shows the components of FIG. 20a as assembled together prior to welding. The first ends 4 of spokes 2 are nested within their respective concave surfaces 220 of the hub flange 218 and the cover 224 is matched to the hub flange 218 so that face 230 contacts face 232 and spokes 2 are also nested within concave surfaces 226 of the cover 224. Horn 234 is then pressed against the cover 224 in the direction 236, which is generally perpendicular to the outer surfaces 66 of the spokes, and energized so that the face 232 of the cover is welded to the face 230 of the hub flange 218 at welded interface 233 and the spokes 2 are welded to their respective concave surfaces 226 and 220 at welded interface 235 in a manner similar to that described in FIGS. 7a-f. Spokes 2 are thus firmly joined and welded to the hub flange 218 and cover 224 for anchoring to resist spoke tension 30 forces. It should be noted that hub shell 219 is actually only a hub half that includes a single hub flange 218. This hub half assembly may be joined to an opposing hub half to complete the hub shell in a manner similar to that described in FIG. 22. While the welded connection described in FIGS. 7a-f is applied here to provide the requisite welded connection between the spoke and hub flange, it is envisioned that a wide variety of alternate welded configurations may adapted to provide a structural connection between the spoke and rim, including most of the embodiments described herein.

Figure 21A:
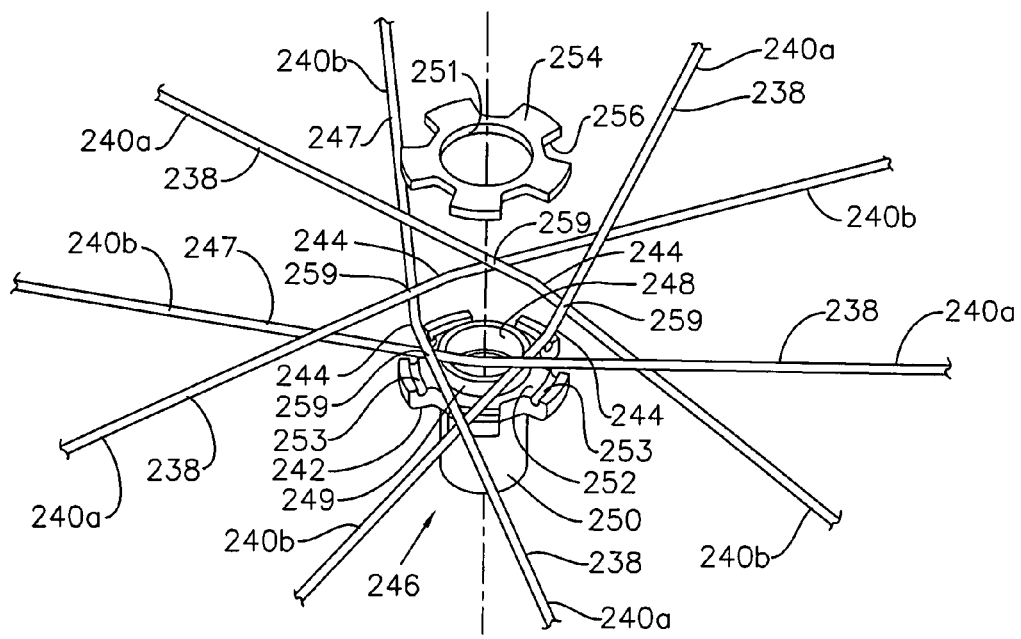
FIG. 21a is a partial perspective exploded view of an embodiment of the present invention, showing a multiplicity of duplex spokes, a hub flange, and a cover.
Figure 21B:
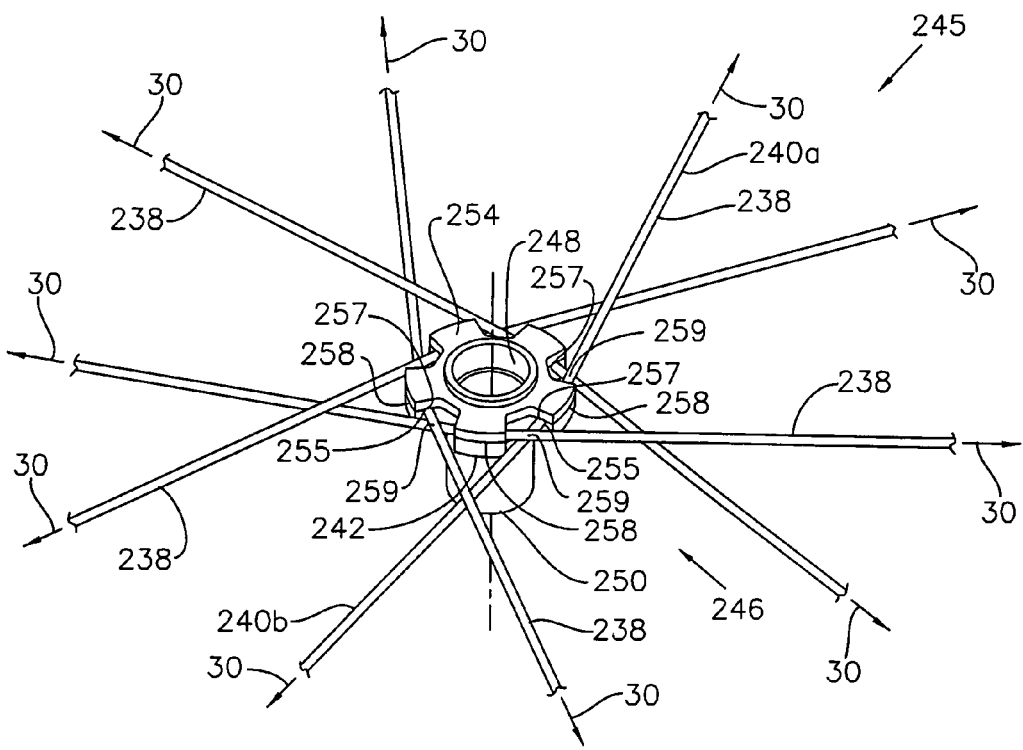
FIG. 21b is a partial perspective view of the embodiment of FIG. 21a, showing the duplex spokes as welded and sandwiched between the hub flange and cover.

FIGS. 21a-b describe an embodiment similar to that of FIGS. 20a-c where a multiplicity of spokes 238 are joined to a single hub flange 242 element. However, the spokes 238 are duplex spokes, each of which is a continuous element that includes two spans 240a and 240b and are fixed at their common portion 244 to the hub flange 242. This is in contrast to the spokes 2 of FIGS. 20a-c, where each spoke comprises only a single span. Spokes 238 have an outer surface 247 that includes thermoplastic polymer material. Hub shell 246 is made of a thermoplastic polymer material, preferably with fiber reinforcement, and includes a hub flange 242, a bearing bore 248 to accept a bearing (not shown), a cylindrical body portion 250, and a collar 249. Hub flange 242 also includes axially outwardly facing face 252 and a multiplicity of concave surfaces 253 that are matched to the outer surfaces 247 of their respective spokes 238 in a manner similar to that described in FIGS. 9a-d. A multiplicity of spokes 238 each include an outer surface 247 that is to be joined to the hub flange 242. Cover 254 is also made of thermoplastic polymer material and is shown here as a generally flat element with a central hole 251 and face 256, which is shown to be facing the face 252. Spokes 238 are first located within their respective concave surfaces 253 and then welded in place to the hub flange 242 at welded interfaces 255 in a manner similar to that described in FIG. 9a. Cover 254 is then assembled to the hub flange 242, with hole 251 piloted and aligned by collar 249. The cover 254 is then welded in place such that face 256 is welded to the outer surfaces 247 of spokes 238 at welded interface 257 and to the face 252 of the hub flange 242 at welded interface 258 in a manner similar to that described in FIG. 9c. Spokes 238 are sandwiched between hub flange 242 and cover 254. The result is the welded wheel half 245 assembly of the hub shell 246, the spokes 238, and the cover 254, to create a firm structural connection between these components as shown in FIG. 21b. Spokes 238 are thus firmly joined and affixed to the hub flange 242 for anchoring to resist spoke tension 30 forces.

Spokes 238 are shown to cross over each other at crossover regions 259. The spokes 238 may be welded to each other at these crossover regions 259 as described in FIG. 18. Further, these crossover regions 259 are shown to be exposed and external to the hub flange 242 and cover 254, however, it is envisioned that these crossover regions 259 may alternatively be concealed and located within the hub flange 242 and/or cover 254. The utilization of duplex spokes is especially advantageous in this arrangement because a portion of the spoke tension 30 may be carried directly through the spoke 238 at its common portion 244, thereby reducing the portion of spoke tension 30 that must be carried by the welded interfaces 255, 257, 258 and/or by the hub flange 242 and cover 254. It should be noted that hub shell 246 is shown here as a wheel half 245 that includes only a single hub flange 242. This wheel half 245 assembly may be joined to an opposing wheel half to provide a wheel hub with two axially opposed hub flanges in a manner similar to that described in FIG. 22. Of course such an arrangement is merely representative of a wide range of hub shell and hub flange arrangements may be utilized in conjunction with the present invention.

As mentioned previously, for a tension-spoke wheel, at least two axially spaced hub flanges are generally required. Compression-spoke wheels often utilize multiple hub flanges as well, although some compression-spoke designs may employ spokes stout enough to require only a single hub flange. It is most common to form the hub shell as a single unit to include the two (or more) hub flanges and a spacer portion therebetween as one integral unit. However, for ease of molding or otherwise forming the hub, it may be advantageous to mold each hub flange separately and subsequently join the two hub flanges to each other after molding to create a complete hub shell. Another advantage of such a joined hub flange assembly system is that hub flange portions of different configurations may now be combined to create a wide range of complete hub shell units. In other words, a front hub shell may be created from two front hub flanges, a rear hub shell may be created from one front hub flange and one rear hub flange, a disc brake hub flange may be substituted to create a disc brake compatible hub shell, etc. Thus, a family of six hub flange combinations may be created from a menu of only three individual hub flange components. The result is a high degree of adaptability with a minimum amount of mold tooling and part inventory.

Figure 22:
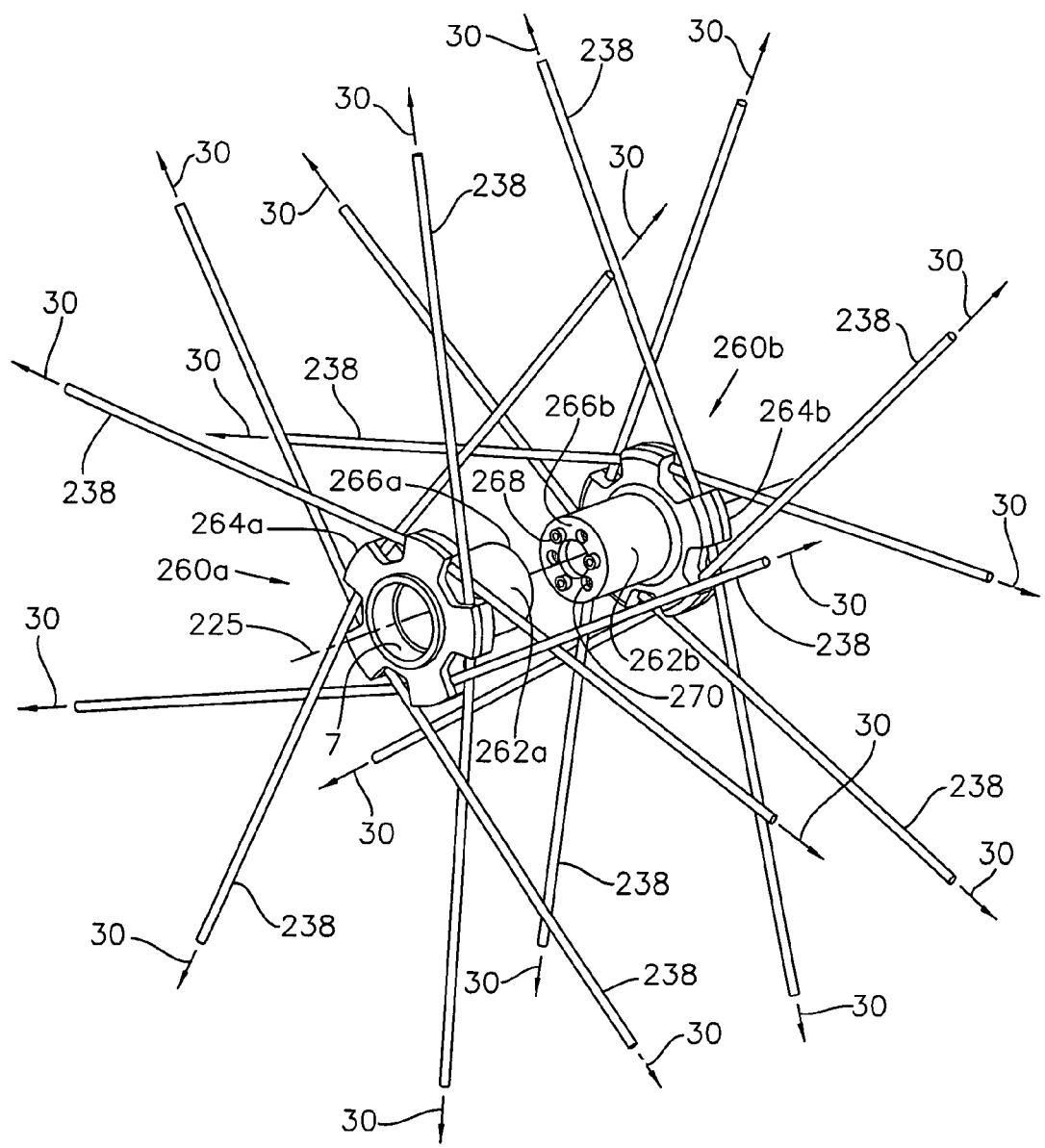
FIG. 22 is a partial perspective exploded view of an embodiment of the present invention, showing two hub half assemblies in back-to-back orientation, including their respective joining faces.

If we view the complete hub shell as including two axially spaced hub flanges with a spacer element to axially separate the hub flanges, the hub flanges and spacer(s) constitute the rotatable hub shell. FIG. 22 describes an embodiment where the hub half assemblies 260a and 260b each include respective hub flanges 264a and 264b, axially extending hub bodies 262a and 262b, bearing bore 7, and spokes 238. These hub bodies 262a and 262b are then joined to each other to lock the flanges 264a and 264b in their proper axially spaced orientation. As shown in this figure, the joining faces 266a and 266b of respective bodies 262a and 262b have mating pegs 268 and sockets 270 that key the flanges 262a and 262b to prevent independent rotation about the axial axis 225 and to align the spokes 238 to span directly to their connection at the rim (not shown). These two flanges 262a and 262b are shown here as identically shaped components that are assembled back-to-back. Joining faces 266a and 266b may then be joined together by a wide variety of means, including mechanical fasteners, adhesive, welding, snap fits, press fits or a variety of other joining methods known to industry. Alternatively, in the absence of a fastening system, the spoke tension forces 30 may be utilized to force the hub flanges 264a and 264b axially toward each other to clamp the joining faces 266a and 266b together. It is further envisioned that the hub bodies 262a and 262b may alternatively be separate elements from their respective hub flanges 264a and 264b, with a joining interface between the body(s) and the hub flanges.

Figure 23A:
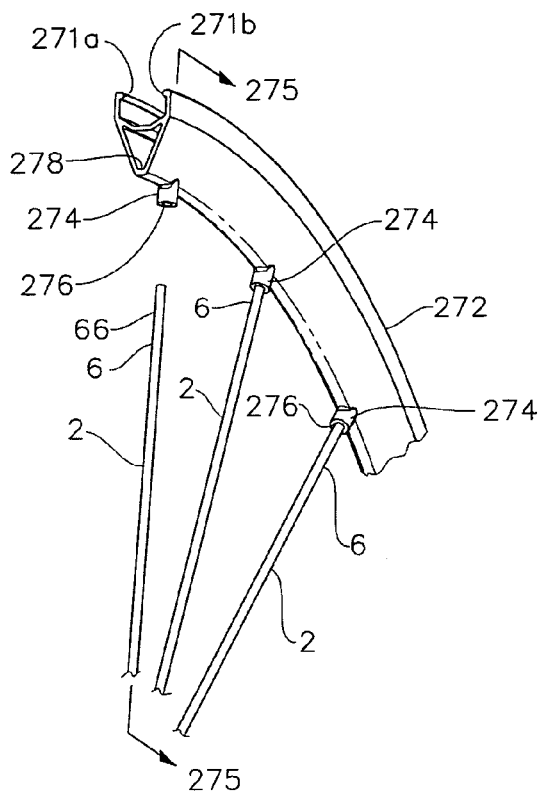
FIG. 23a is a partial perspective exploded view of an embodiment of the present invention, showing the spoke prior to assembly with a rim, where the rim includes an integral collar portion.
Figure 23B:
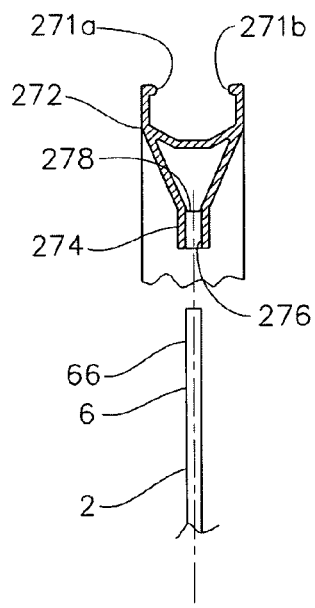
FIG. 23b is a radial cross sectional exploded view, as seen in the direction 275-275, of the embodiment of FIG. 23a, showing a spoke prior to its assembly with the collar portion of the rim.
Figure 23C:
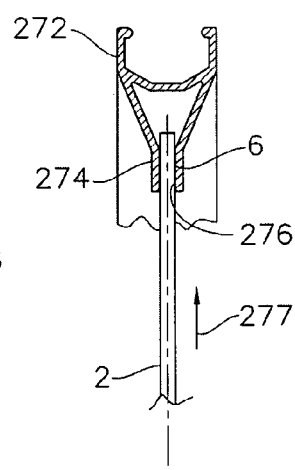
FIG. 23c is a radial cross sectional view, as seen in the direction 275-275, of the embodiment of FIG. 23b, showing the spoke as assembled to the collar of the rim prior to welding.
Figure 23D:
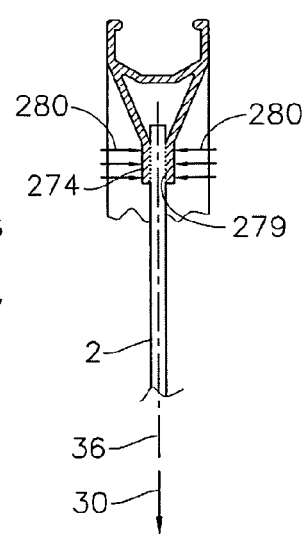
FIG. 23d is a radial cross sectional view, as seen in the direction 275-275, of the embodiment of FIG. 23c, showing the spoke as welded to the rim.

While FIGS. 20a-c, FIGS. 21a-b, and FIG. 22 show examples where the spoke(s) may be directly welded to the hub flange, it is also envisioned that the spokes may be welded at their second end to the outer rim. FIG. 23a-d describe an embodiment where the second end 6 of the spoke is directly welded to the rim 272. Rim 272 is constructed of thermoplastic polymer material, preferably including reinforcement fibers, and includes inward facing ribs 271a and 271b to accept a conventional tire (not shown) and a spoke bed 278 wall, to which the spokes 2 are joined. Spoke bed 278 includes a series of integral collars 274 extending radially inwardly therefrom, each with a hole 276 therethrough that extends in a generally radial direction. FIG. 23a shows a portion of the outer rim 272 hoop, with some of the spokes 2 fixed to the rim and with one of the spokes ready to be assembled to the rim. As may be seen in FIG. 23b, which shows the spoke 2 prior to assembly with the rim 272, the outer surface 66 of spoke 2 is sized to fit within the hole 276 that extends through the spoke bed 278 of the rim. The second end 6 of the spoke 2 is then inserted into hole 276 in the direction 277 as shown in FIG. 23c. With spoke 2 in place, ultrasonic energy and clamping force is applied to the collar 274 in the direction 280 as shown in FIG. 23d to create a firmly welded connection between the spoke 2 and the rim 272 at a welded interface 279 between the outer surface 66 and the hole 276. Although the ultrasonic horn and nest are not shown here, it is understood that this welded connection is similar to that described in FIGS. 6a-b, where the collar 274 corresponds to collar 52. Spoke 2 is now firmly joined to the rim 272 via welded interface 279, such that this joinder will support spoke tension 30 forces along the tensile axis 36 of the spoke 2. While the welded connection described in FIGS. 6a-b is applied here to provide the requisite welded connection between the spoke and rim, it is envisioned that a wide variety of alternate welded configurations may adapted to provide a structural connection between the spoke and rim, including most of the embodiments described herein.

Figure 24A:
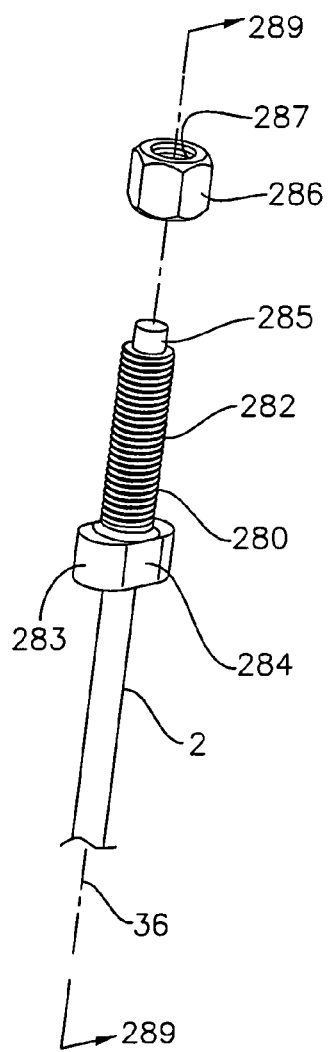
FIG. 24a is a partial perspective exploded view of an embodiment of the present invention, showing a spoke with threaded collar and a mating nut.
Figure 24B:
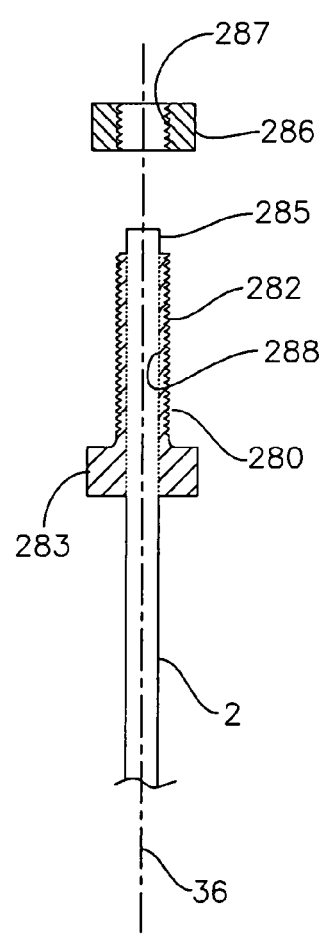
FIG. 24b is a a is a cross sectional view, taken along the tensile axis, as seen in the direction 289-289, of the embodiment of FIG. 24a, showing the spoke as passing through the threaded collar.

FIGS. 24a-b describe an embodiment where a collar 280 includes geometry to facilitate anchoring of the spoke 2. Collar 280 includes an externally threaded shank 282 and an enlarged portion 283 at one end. The enlarged portion 283 includes flats 284 that may be gripped by a wrench (not shown) to twist or to prevent twisting of the collar 280 about the tensile axis 36. Collar 280 is joined to spoke 2 at welded interface 288, as shown in FIG. 24b. Such a welded interface 288 may be achieved by any manner of processes, including those described herein. As shown in FIG. 24a, hex nut 286 includes internal threads 287 to threadably mate with male-threaded shank 282 to facilitate connection with a bracing element such as the rim (not shown). For example, shank 282 may extend through a hole in the rim (not shown), with the nut 286 threaded from the opposite side of the rim such that the nut 286 provides an overlie connection with the rim. Thus, nut 286 serves as an intermediate or auxiliary connecting element to connect the collar 280 to the bracing element. Collar 280 may also be viewed as a connecting element to facilitate the connection of the spoke 2 with the bracing element. Nut 286 may be threadably adjusted relative to collar 280 in a manner similar to the spoke nipple 21 of FIGS. 2a-b. Note that, in this embodiment, spoke 2 extends through the collar 280 to include a second exposed portion 285. This permits the welded interface 288 to extend along the full longitudinal length of the collar to maximize the surface area of the welded interface 288.

While these figures show the collar 280 to be an end termination of the spoke 2, the collar 280 may alternatively be located at some point midway along the length of the spoke 2. In such a case, the spoke 2 would extend through the collar 280 and could extend further to create a second tensile span. Thus, for example, the collar 280 could serve as an anchor point between the two tensile spans of a duplex spoke.

Figure 24C:
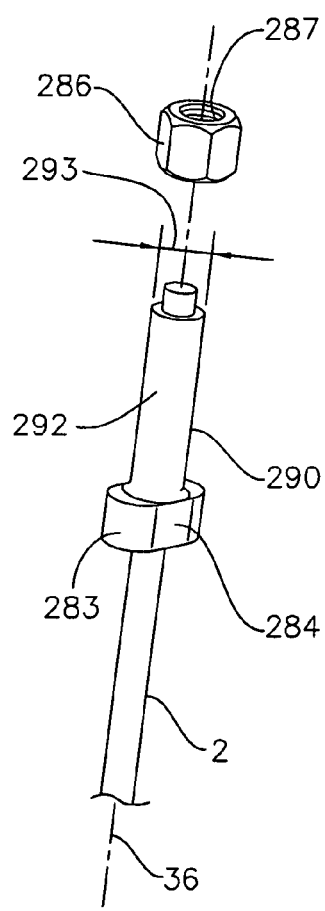
FIG. 24c is a partial perspective exploded view of an embodiment of the present invention, showing a spoke with an unthreaded collar and a mating nut.

FIG. 24c describes an embodiment similar to FIGS. 24a-b, however the collar 290 does not include external threads. Instead, the shank 292 of the collar 290 is generally smooth. Collar 290 also includes enlarged portion 283 and flats 284 similar to FIGS. 24a-b. In this embodiment, nut 286, with internal threads 287, is intended to thread onto shank 292 in a "thread-forming" engagement. Thus the nut 286 is preferably of harder material than the shank 292 and the action of threadably engaging the internal threads 287 with the shank 292 serves to deform the shank 292 to create external threads in the previously smooth shank 292. To create an optimal thread-forming engagement, it is usually desirable that the diameter 293 of the shank 292 be sized at the approximate pitch diameter of internal threads 287. This embodiment is an example of an arrangement where an auxiliary element (nut 286) is used to pinch and grip the shank 292 of the collar 283, with the shank 292 oriented generally parallel to the tensile axis 36, to create an engagement to effectively anchor the tensile element (spoke 2). Of course, such a gripping action may be achieved with a wide variety of arrangements well known in industry, including arrangements that clamp, grip, deform, or engage the collar.

FIGS. 25a-b describe an embodiment conceptually similar to the embodiment of FIGS. 16a-b, however an intermediate element is employed here to create the desired geometry to facilitate the connection between the collar and bracing element. As shown in FIG. 25a, collar 294 includes an enlarged portion 295, a shank 297, and a flared shoulder 296. While this collar 294 may serve as an anchor point to directly connect with the bracing element 298 (such as a hub flange or rim), the collar 294 is preferably made from a relatively soft polymer resin and, if the geometry of the bracing element is not well matched to the geometry of the collar 294, the mating surfaces may distort slightly under applied tensile loads 30. Therefore, it may be preferable to utilize a ferrule 300 that includes a bearing surface 302 to mate with the flared shoulder 296. As shown in FIG. 25b, the spoke 2 is joined to the collar 294 at a representative welded interface 301. The bearing surface 302 is well-matched to the surface of the flared shoulder 296 to distribute the contact stresses over a broader surface-to-surface area, rather then a surface-to-edge type of contact. The ferrule 300 is preferably made of a harder material, such as aluminum. The spoke 2 extends through a hole 304 in the bracing element 298 as shown. As shown in FIG. 25b, spoke tension 30 is applied to the assembly, forcing collar 294 to bear against the ferrule 300 and the ferrule 300 to bear against the bracing element 298. Thus, it may be seen that the ferrule 300 serves as an intermediate connecting element, structurally engaged between the spoke 2 and the bracing element 298, to facilitate the connection between the spoke 2 and the bracing element 298. This embodiment also shows a general arrangement where the collar 294 includes a bearing surface (shoulder 296) that creates a projected area of overlie that is perpendicular to the tensile axis 36 to create an overlie engagement to effectively terminate the tensile element (spoke 2).

FIGS. 26a-b describe an embodiment similar to FIGS. 25a-b, however, the ferrule 300 is replaced by threaded ferrule 306. Collar 308 includes an enlarged portion 310 with a flared shoulder 312. One end of the collar 308 includes splines 314 to mate with a wrench (not shown) for rotational manipulation of the collar 308. Threaded ferrule 306 includes external threads 316 and flats 318 to mate with a wrench (not shown) for rotational manipulation of the threaded collar 308 ferrule 306. The inside diameter of the threaded collar 308 includes a step 320 to create a closely matched bearing surface to mate with the flared shoulder 312 of the collar 308. Collar 308 is joined to the spoke 2 by means of welding interface at a representative welded interface 326. A bracing element, such as a rim 322, includes a threaded hole 324 in the spoke bed 307 wall. By utilizing separate wrenches on splines 314 and flats 318, the threaded ferrule 306 may be rotated independently from the collar 308 about the tensile axis 36. Threaded ferrule 306 may be rotated relative to rim 322 to adjust the effective length of the spoke 2 span, thus adjusting the spoke tension 30. Thus, it may be seen that the threaded ferrule 306 serves as an intermediate connecting member to facilitate the connection between the spoke 2 and the rim 322.

While my above description contains many specificities, these should not be construed as limitations on the scope of the invention, but rather as exemplifications of embodiments thereof. For example:

The present invention describes various methods and arrangements whereby a tensile element is joined to a connecting element by a welded interface. This connecting element may be integral with the bracing element, with a welded interface between the tensile element and the bracing element, as illustrated in FIGS. 15a-d and FIGS. 23a-d. Alternatively, the connecting element may be separate from the bracing element and may be connected or otherwise engaged with the bracing element, as illustrated in the embodiments of FIGS. 3a-b and FIGS. 16a-b. A further alternative is an arrangement where the connecting element may be integral with the tensile element, with a welded interface between the tensile element and itself, as illustrated in the embodiment of FIG. 17. A still further alternative is an arrangement where the connecting element is connected a second tensile element, as illustrated in the embodiments of FIGS. 19a-b and 19c-d. A yet further alternative is an arrangement where the connecting element is connected to the bracing element via one or more intermediate element(s), as illustrated in the embodiments of FIGS. 24a-b, FIG. 24c, FIGS. 25a-b, and FIGS. 26a-b.

While several of the embodiments shown describe a single continuous welded interface to anchor a single tensile element, it is also envisioned that a multiplicity of welded interfaces may be utilized to anchor a single tensile element. For example, a multiplicity of connecting elements may be welded to a single tensile element, each having its own corresponding welded interface. Alternatively, a single tensile element may be welded to a single connecting element at a multiplicity of discreet locations, resulting in a multiplicity of welded interfaces.

While the above description is particularly focused on bicycle or vehicle wheel spokes as tensile elements, and this is the preferred embodiment of the present invention, however it is envisioned that the present invention may be adapted to applications involving a wide range of tensile element applications outside of vehicle wheel applications. Some example applications may include control cables, guy wires, fiber optic cables, overhead high-tension lines, architectural and infrastructure cabling, pre-stressed rebar, etc.

While the embodiments illustrated herein are focused on the utilization of ultrasonic welding techniques to create welded interfaces to join elements with surfaces of thermoplastic polymer materials, these are merely representative welding techniques and surface materials. The present invention may be readily applied to a wide range of alternate welding techniques as described hereinabove. Further, the present invention may be applied to join elements of any weldable material, including metals. In the case of metals, some additional welding techniques that may be employed include resistance welding, induction welding, friction welding, etc.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications that are within its spirit and scope as defined by the claims.

Thus, the present invention provides a vehicle wheel that is inexpensive to produce, lends itself easily to high-volume manufacturing methods, is light in weight and is strong and reliable. Further, the present invention reduces the amount of labor required to assemble the wheel. Further still, the present invention reduces component cost through the use of lower-cost materials, by reducing the tolerances and number of forming operations required in spoke manufacture, and by utilizing net-shape hub forming operations to reduce scrap and fabrication expense. Further still, the present invention reduces wheel weight by facilitating the utilization of light weight hub materials, by allowing greater freedom in hub flange detail and geometry to optimize the design, by facilitating the use of multi-filament spokes, and by facilitating hybrid hub shell construction where high-strength materials are used only where necessary. Yet further, the present invention increases the strength and reliability of the wheel by reducing stresses in components and connections, by eliminating any clearances or relative movement between the hub and spokes, and by eliminating any unsupported bends in the spokes.

What is claimed is:

1. A tensile connector assembly, comprising:
   a longitudinal tensile element having a longitudinal axis, an end portion, and a cross-section thereof;
   a connecting element connected to said longitudinal tensile element;
   a bracing element connected to said longitudinal tensile element;
   wherein said longitudinal tensile element is anchored to said bracing element;
   a tensile axis of applied tensile load along said longitudinal tensile element;
   wherein said connecting element is connected to said longitudinal tensile element by means of a welded connection at a welded interface;
   wherein said longitudinal tensile element supports said tensile load along said tensile axis;
   wherein said longitudinal tensile element is a spoke of a vehicle wheel; and
   wherein said connecting element includes a first portion thereof, which partially surrounds the cross section of said longitudinal tensile element, with an open portion remaining, and a second portion thereof which surrounds the remaining open portion.

2. A tensile connector assembly according to claim 1, wherein the first portion of said connecting element is welded to the second portion of said connecting element.

3. A tensile connector assembly according to claim 1, wherein said connecting element is a multi-piece connecting element comprised of a multiplicity of pieces that are each welded to said longitudinal tensile element at a corresponding multiplicity of said welded interfaces.

4. A tensile connector assembly according to claim 1, wherein said welded connection between said connecting element and said longitudinal tensile element supports said tensile load.

5. A tensile connector assembly according to claim 1, wherein said longitudinal tensile element includes a thermoplastic polymer portion and wherein said connecting element includes a thermoplastic polymer portion, and wherein said thermoplastic polymer portion of said longitudinal tensile element is welded to said thermoplastic polymer portion of said connecting element.

6. A tensile connector assembly according to claim 1, wherein said welded interface is a sidewall welded interface, wherein said welded interface occurs substantially on the sidewall of the longitudinal tensile element.

7. A tensile connector assembly according to claim 6, wherein said welded interface extends longitudinally along said sidewall for a distance greater than twice the cross sectional thickness of said longitudinal tensile element.

8. A tensile connector assembly according to claim 1, wherein said longitudinal tensile element includes high strength fibers and wherein at least a portion of said high strength fibers are aligned to be generally parallel to said tensile axis.

9. A tensile connector assembly according to claim 8, wherein said high strength fibers are encapsulated in a matrix.

10. A tensile connector assembly according to claim 9, wherein said matrix is a thermoplastic polymer resin matrix.

11. A tensile connector assembly according to claim 8, wherein said high strength fibers are continuous fibers that extend generally along the length of said longitudinal tensile element.

12. A tensile connector assembly according to claim 8, wherein said high strength fibers of said longitudinal tensile element extend along said longitudinal axis to overlap within the region of said welded interface.

13. A tensile connector assembly according to claim 1, wherein said connecting element includes reinforcement fibers.

14. A tensile connector assembly according to claim 1, wherein said connecting element is welded to said longitudinal tensile element by means of mechanical energy imparted to said welded interface to create the heat requisite for a welded connection therein.

15. A tensile connector assembly according to claim 14, wherein said mechanical energy is created through an ultrasonic welding process.

16. A tensile connector assembly according to claim 1, wherein said longitudinal tensile element includes a sidewall surface and wherein said welded interface is achieved by means of welding pressure that is applied in a direction generally perpendicular to said sidewall surface.

17. A tensile connector assembly according to claim 1, wherein said connecting element includes a mating surface and wherein said longitudinal tensile element includes a mating surface and wherein said mating surface of said longitudinal tensile element is generally matched to said mating surface of said connecting element at said welded interface.

18. A tensile connector assembly according to claim 17, wherein said matched surfaces are generally flat surfaces.

19. A tensile connector assembly according to claim 1, wherein at least one of i) said longitudinal tensile element is deformed to conform to said connecting element by means of the welding to create said welded interface and ii) said connecting element is deformed to conform to said longitudinal tensile element by means of the welding to create said welded interface.

20. A tensile connector assembly according to claim 1, wherein said connecting element includes a cavity, wherein said longitudinal tensile element is located within said cavity and wherein said welded interface is between said cavity and said longitudinal tensile element.

21. A tensile connector assembly according to claim 1, wherein said connecting element includes a longitudinal slot or weakened region.

22. A tensile connector assembly according to claim 1, wherein said connecting element is integral with said bracing element and wherein said longitudinal tensile element is welded directly to said bracing element at said welded interface.

23. A tensile connector assembly according to claim 1, wherein said connecting element is directly connected with said bracing element.

24. A tensile connector assembly according to claim 1, wherein said connecting element includes an enlarged head portion for connection with said bracing element.

25. A tensile connector assembly according to claim 1, wherein said connecting element is engaged to said bracing element by means of an overlie engagement.

26. A tensile connector assembly according to claim 1, wherein said longitudinal tensile element is bent or otherwise deflected from said tensile axis in a bent region and wherein said welded interface is in said bent region.

27. A tensile connector assembly according to claim 1, including a multiplicity of said longitudinal tensile elements, wherein a first of said longitudinal elements is connected to a second of said longitudinal tensile elements by means of said welded interface.

28. A tensile connector assembly according to claim 1, wherein said connecting element serves as a coupling to connect a first longitudinal tensile element with a second longitudinal tensile element.

29. A tensile connector assembly according to claim 1, wherein said connecting element serves as a termination to connect said longitudinal tensile element with said bracing element.

30. A tensile connector assembly according to claim 1, including a multiplicity of longitudinal tensile elements connected to at least one of i) a common one of said bracing element and ii) a common one of said connecting element.

31. A tensile connector assembly according to claim 30, wherein said common one of said bracing element is the hub flange of a vehicle wheel.

32. A tensile connector assembly according to claim 1, wherein said longitudinal tensile element is a continuous element that includes a first structural span and a second structural span, with a common portion therebetween and wherein said common portion is connected to said bracing element.

33. A tensile connector assembly according to claim 32, wherein said continuous element is a duplex spoke of a vehicle wheel.

34. A tensile connector assembly according to claim 1, wherein said bracing element is one of i) a first hub flange of a vehicle wheel, wherein said first hub flange is connected to a second hub flange that is axially spaced from said first hub flange and ii) a rim hoop of a vehicle wheel.

35. A tensile connector assembly according to claim 1, wherein said connecting element includes a threaded portion for a threadable engagement to connect said connecting element to said bracing element.

36. A tensile connector assembly according to claim 1, including an intermediate connecting element, wherein said connecting element is connected to said intermediate connecting element and said intermediate connecting element is connected to said bracing element.

37. A tensile connector assembly according to claim 36, wherein said intermediate connecting element includes a threadable engagement for connection with at least one of the connecting element and said bracing element.

38. A tensile connector assembly according to claim 1, wherein said connecting element is a generally preformed element and said longitudinal tensile element is a generally preformed element and wherein said welded interface is between said preformed connecting element and said preformed longitudinal tensile element.

39. A tensile connector assembly comprising:
a longitudinal tensile element having a longitudinal axis, an end portion, and a cross-section thereof;
a connecting element connected to said longitudinal tensile element;
a bracing element connected to said longitudinal tensile element;
wherein said longitudinal tensile element is anchored to said bracing element;
a tensile axis of applied tensile load along said longitudinal tensile element;
wherein said connecting element is connected to said longitudinal tensile element by means of a welded connection at a welded interface;
wherein said longitudinal tensile element supports said tensile load along said tensile axis;
wherein said longitudinal tensile element is a spoke of a vehicle wheel;
wherein said longitudinal tensile element is deformed to conform to said connecting element during the welding to create said welded interface; and
wherein the cross section of said longitudinal tensile element is flattened during the welding to create said welded interface.

40. A tensile connector assembly according to claim 39, wherein said connection between said connecting element and said longitudinal tensile element supports said tensile load.

41. A tensile connector assembly according to claim 39, wherein said longitudinal tensile element includes a thermoplastic polymer portion and wherein said connecting element includes a thermoplastic polymer portion, and wherein said thermoplastic polymer portion of said longitudinal tensile element is welded to said thermoplastic polymer portion of said connecting element.

42. A tensile connector assembly according to claim 39, wherein said welded interface is a sidewall welded interface, wherein said welded interface occurs substantially on the sidewall of the longitudinal tensile element.

43. A tensile connector assembly according to claim 39, wherein said longitudinal tensile element includes high strength fibers and wherein at least a portion of said high strength fibers are aligned to be generally parallel to said tensile axis.

44. A tensile connector assembly according to claim 43, wherein said high strength fibers are encapsulated in a matrix and wherein said matrix is a thermoplastic polymer resin matrix.

45. A tensile connector assembly according to claim 39, wherein said connecting element includes reinforcement fibers.

46. A tensile connector assembly according to claim 39, wherein said connecting element is welded to said longitudinal tensile element by means of mechanical energy imparted to said welded interface to create the heat requisite for a welded connection therein.

47. A tensile connector according to claim 39, wherein said longitudinal tensile element includes a sidewall surface and wherein said welded interface is achieved by means of welding pressure that is applied in a direction generally perpendicular to said sidewall surface.

48. A tensile connector assembly according to claim 39, wherein said connecting element includes a mating surface and wherein said longitudinal tensile element includes a mating surface and wherein said mating surface of said longitudinal tensile element is generally matched to said mating surface of said connecting element at said welded interface.

49. A tensile connector assembly according to claim 48, wherein at least one of said longitudinal tensile element and said connecting element is concave to partially surround the other of said longitudinal tensile element and said connecting element.

50. A tensile connector assembly according to claim 39, wherein said connecting element includes a cavity, wherein said longitudinal tensile element is located within said cavity and wherein said welded interface is between said cavity and said longitudinal tensile element.

51. A tensile connector assembly according to claim 39, wherein said connecting element generally surrounds the cross section of said longitudinal tensile element.

52. A tensile connector assembly according to claim 39, wherein said connecting element includes a longitudinal slot or weakened region.

53. A tensile connector assembly according to claim 39, wherein said connecting element includes a first portion and a second portion and wherein said longitudinal tensile element is sandwiched between said first portion and said second portion.

54. A tensile connector assembly according to claim 39, wherein said connecting element is integral with said bracing element and wherein said longitudinal tensile element is welded directly to said bracing element at said welded interface.

55. A tensile connector assembly according to claim 39, wherein said connecting element is engaged to said bracing element by means of an overlie engagement.

56. A tensile connector assembly according to claim 39, wherein said longitudinal tensile element is bent or otherwise deflected from said tensile axis in a bent region and wherein said welded interface is in said bent region.

57. A tensile connector assembly according to claim 39, wherein said longitudinal element is welded to itself for connection with said bracing element.

58. A tensile connector assembly according to claim 39, including a multiplicity of said longitudinal tensile elements, wherein a first of said longitudinal elements is connected to a second of said longitudinal tensile elements by means of said welded interface.

59. A tensile connector assembly according to claim 39, wherein said connecting element serves as a coupling to connect a first longitudinal tensile element with a second longitudinal tensile element.

60. A tensile connector assembly according to claim 39, wherein said connecting element serves as a termination to connect said longitudinal tensile element with said bracing element.

61. A tensile connector assembly according to claim 39, including a multiplicity of longitudinal tensile elements connected to at least one of i) a common one of said bracing element and ii) a common one of said connecting element.

62. A tensile connector assembly according to claim 61, wherein said common one of said bracing element is the hub flange of a vehicle wheel.

63. A tensile connector assembly according to claim 61, wherein said common one of said bracing element is the rim hoop of a vehicle wheel.

64. A tensile connector assembly according to claim 39, wherein said longitudinal tensile element is a continuous element that includes a first structural span and a second structural span, with a common portion therebetween and wherein said common portion is connected to said bracing element.

65. A tensile connector assembly according to claim 39, including an intermediate connecting element, wherein said connecting element is connected to said intermediate connecting element and said intermediate connecting element is connected to said bracing element.

66. A tensile connector assembly according to claim 39, wherein said connecting element is a generally preformed element and said longitudinal tensile element is a generally preformed element and wherein said welded interface is between said preformed connecting element and said preformed longitudinal tensile element.

67. A tensile connector assembly comprising:
a longitudinal tensile element having a longitudinal axis, an end portion, and a cross-section thereof;
a connecting element connected to said longitudinal tensile element;
a bracing element connected to said longitudinal tensile element;
wherein said longitudinal tensile element is anchored to said bracing element;
a tensile axis of applied tensile load along said longitudinal tensile element;
wherein said connecting element is connected to said longitudinal tensile element by means of a welded connection at a welded interface;
wherein said longitudinal tensile element supports said tensile load along said tensile axis;
wherein said longitudinal tensile element is a spoke of a vehicle wheel;
including a multiplicity of said longitudinal tensile elements, wherein a first of said longitudinal tensile elements is connected to a second of said longitudinal tensile elements by means of said welded interface; and
wherein said first of said longitudinal tensile elements is directly welded to a second of said longitudinal tensile elements at said welded interface.

68. A tensile connector assembly according to claim 67, wherein a multiplicity of longitudinal tensile elements are welded to each other to form a daisy chain of interconnected longitudinal tensile elements.

69. A tensile connector assembly according to claim 67, wherein said welded interface is a sidewall welded interface, wherein said welded interface occurs substantially on the sidewall of the longitudinal tensile element.

70. A tensile connector assembly according to claim 67, wherein said welded interface is an end face welded interface.

71. A tensile connector assembly according to claim 67, wherein said longitudinal tensile element includes high strength fibers and wherein at least a portion of said high strength fibers are aligned to be generally parallel to said tensile axis.

72. A tensile connector assembly according to claim 71, wherein said high strength fibers are encapsulated in a matrix.

73. A tensile connector assembly according to claim 72, wherein said matrix is a thermoplastic polymer resin matrix.

74. A tensile connector assembly according to claim 67, wherein said longitudinal tensile element includes a sidewall surface and wherein said welded interface is achieved by means of welding pressure that is applied in a direction generally perpendicular to said sidewall surface.

* * * * *